US011077432B2

(12) United States Patent
Lin et al.

(10) Patent No.: US 11,077,432 B2
(45) Date of Patent: Aug. 3, 2021

(54) ION-EXCHANGED MOLECULAR SIEVE CATALYSTS EXHIBITING REDUCED N2O EMISSIONS

(71) Applicant: BASF CORPORATION, Florham Park, NJ (US)

(72) Inventors: Wenyong Lin, Rolling Meadows, IL (US); Jaya Lakshmi, Edison, NJ (US); Xinsheng Liu, Edison, NJ (US); John Hochmuth, Raritan, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/124,268

(22) Filed: Sep. 7, 2018

(65) Prior Publication Data
US 2019/0134617 A1 May 9, 2019

Related U.S. Application Data

(63) Continuation of application No. PCT/IB2017/051299, filed on Mar. 6, 2017.
(Continued)

(51) Int. Cl.
B01J 29/06 (2006.01)
B01J 29/76 (2006.01)
(Continued)

(52) U.S. Cl.
CPC ............ B01J 29/763 (2013.01); B01D 53/94 (2013.01); B01D 53/944 (2013.01); B01D 53/9418 (2013.01); B01D 53/9459 (2013.01); B01J 29/505 (2013.01); B01J 29/52 (2013.01); B01J 29/54 (2013.01); B01J 29/56 (2013.01); B01J 29/58 (2013.01); B01J 29/7015 (2013.01); B01J 29/7065 (2013.01); B01J 29/723 (2013.01); B01J 29/743 (2013.01); B01J 29/783 (2013.01); B01J 35/0093 (2013.01); B01J 35/04 (2013.01); B01J 37/0209 (2013.01); B01J 37/0215 (2013.01); B01J 37/0236 (2013.01); B01J 37/0246 (2013.01); B01J 37/08 (2013.01); F01N 3/106 (2013.01); F01N 3/20 (2013.01);
(Continued)

(58) Field of Classification Search
CPC ............ B01D 53/9418; B01D 53/9459; B01D 53/94; B01D 53/944; B01D 2255/50; B01D 2255/2066; B01D 2255/20776; B01D 2255/37; B01D 2255/20753; B01D 2255/20738; B01D 2255/9155; B01D 2255/104; B01D 2255/2065; B01D 2255/20761; B01D 2255/20769; B01D 2255/2068; B01D 2255/20792; B01D 2255/2063; B01D 2255/2073; B01D 2255/20723; B01D 2255/20746; B01D 2255/2061; B01D 2255/20707; B01D 2255/20784; B01D 2258/012; B01D 2257/40; B01D 2257/404; Y02C 20/10; F01N 3/106; F01N 3/20; F01N 3/2828; F01N 3/2066; F01N 2330/06; F01N 2510/062; F01N 2610/02; F01N 2370/04; F01N 2510/063; F01N 2610/1453; B01J 2229/37; B01J 2229/18; B01J 2229/186; B01J 29/763; B01J 29/505; B01J 29/52; B01J 29/54; B01J 29/56; B01J 29/58; B01J 29/7065; B01J 29/723; B01J 29/743; B01J 29/783; B01J 35/04; B01J 35/0006; B01J 35/0073; B01J 37/0215; B01J 37/0236; B01J 29/7015; B01J 37/08; B01J 37/024; B01J 37/0246; B01J 37/30; B01J 37/0201; B01J 37/0205; B01J 37/0209; B01J 35/0093
USPC ............... 502/60, 73, 74, 85; 422/177, 180; 423/235, 239.1, 239.2
See application file for complete search history.

(56) References Cited

U.S. PATENT DOCUMENTS 3,030,181 A 4/1962 Milton
4,440,871 A 4/1984 Lok et al.
(Continued)

FOREIGN PATENT DOCUMENTS

CN 104624228 A 5/2015
CN 104888851 A1 9/2015
(Continued)

OTHER PUBLICATIONS

Barrer, R. M. et al, "The hydrothermal chemistry of the silicates. Part VII. Synthetic potassium aluminosilicates." J. Chem. Soc.,1956 p. 2882-2891.
Bleken, F. et al., "The Effect of Acid Strength on the Conversion of Methanol to Olefins Over Acidic Microporous Catalysts with the CHA Topology," Topics in Catalysis 52, 3, (2009), 218-228.
Feng, Bin et al: "Selective catalytic reduction of nitric oxide with ammonia over zirconium-doped copper/ZSM-5 catalysts", Applied Catalysis B: Environmental, vol. 150-151, No. 151, May 1, 2014, pp. 532-543.
(Continued)

Primary Examiner — Elizabeth D Wood
(74) Attorney, Agent, or Firm — Finnegan, Henderson, Farabow, Garrett & Dunner LLP

(57) ABSTRACT

The present disclosure generally provides catalysts, catalyst articles and catalyst systems including such catalyst articles. In particular, the catalyst composition includes a metal ion-exchanged molecular sieve ion-exchanged with at least one additional metal, which reduces the number of metal centers often present in metal promoted zeolite catalysts. Methods of making and using the catalyst composition are also provided, as well as emission treatment systems including a catalyst article coated with the catalyst composition. The catalyst article present in such emission treatment systems is useful to catalyze the reduction of nitrogen oxides in gas exhaust in the presence of a reductant while minimizing the amount of dinitrogen oxide emission.

23 Claims, 7 Drawing Sheets

Related U.S. Application Data

(60) Provisional application No. 62/305,141, filed on Mar. 8, 2016.

(51) Int. Cl.

| | | |
|---|---|---|
| *B01D 53/94* | (2006.01) | |
| *F01N 3/20* | (2006.01) | |
| *B01J 29/50* | (2006.01) | |
| *B01J 29/52* | (2006.01) | |
| *B01J 29/72* | (2006.01) | |
| *B01J 29/54* | (2006.01) | |
| *B01J 29/56* | (2006.01) | |
| *B01J 29/58* | (2006.01) | |
| *B01J 29/70* | (2006.01) | |
| *B01J 29/78* | (2006.01) | |
| *B01J 29/74* | (2006.01) | |
| *B01J 37/02* | (2006.01) | |
| *B01J 35/00* | (2006.01) | |
| *B01J 35/04* | (2006.01) | |
| *B01J 37/08* | (2006.01) | |
| *F01N 3/10* | (2006.01) | |
| *F01N 3/28* | (2006.01) | |

(52) U.S. Cl.
CPC .......... *F01N 3/2066* (2013.01); *F01N 3/2828* (2013.01); *B01D 2255/104* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/2073* (2013.01); *B01D 2255/20707* (2013.01); *B01D 2255/20723* (2013.01); *B01D 2255/20738* (2013.01); *B01D 2255/20746* (2013.01); *B01D 2255/20753* (2013.01); *B01D 2255/20761* (2013.01); *B01D 2255/20769* (2013.01); *B01D 2255/20776* (2013.01); *B01D 2255/20784* (2013.01); *B01D 2255/20792* (2013.01); *B01D 2255/50* (2013.01); *B01D 2255/9155* (2013.01); *B01D 2258/012* (2013.01); *B01J 2229/18* (2013.01); *B01J 2229/186* (2013.01); *B01J 2229/37* (2013.01); *F01N 2330/06* (2013.01); *F01N 2370/04* (2013.01); *F01N 2510/063* (2013.01); *F01N 2610/02* (2013.01); *F01N 2610/1453* (2013.01); *Y02C 20/10* (2013.01)

(56) References Cited

U.S. PATENT DOCUMENTS

| | | |
|---|---|---|
| 4,544,538 A | 10/1985 | Zones |
| 6,162,415 A | 12/2000 | Liu et al. |
| 6,709,644 B2 | 3/2004 | Zones et al. |
| 7,264,789 B1 | 9/2007 | Van Den Berge et al. |
| 7,601,662 B2 | 10/2009 | Bull et al. |
| 8,293,198 B2 | 10/2012 | Beutel et al. |
| 8,715,618 B2 | 5/2014 | Trukhan et al. |
| 8,883,119 B2 | 11/2014 | Bull et al. |
| 8,961,914 B2 * | 2/2015 | Mohanan ............... B01J 29/763 423/213.2 |
| 9,138,732 B2 | 9/2015 | Bull et al. |
| 9,162,218 B2 | 10/2015 | Bull et al. |
| 9,242,238 B2 * | 1/2016 | Mohanan ............... B01D 53/94 |
| 9,486,792 B2 * | 11/2016 | Mohanan ............... B01J 29/83 |
| 10,471,413 B2 * | 11/2019 | Mohanan ............... B01J 35/026 |
| 2004/0012087 A1 | 6/2004 | Tran et al. |
| 2014/0011285 A1 | 4/2014 | Mohanan et al. |
| 2014/0112853 A1 * | 4/2014 | Mohanan ............... B01J 29/83 423/213.5 |
| 2015/0025853 A1 | 1/2015 | Englander et al. |
| 2015/0258537 A1 | 9/2015 | Morohoshi et al. |
| 2015/0367336 A1 * | 12/2015 | Trukhan ............ B01D 53/9477 423/239.2 |

FOREIGN PATENT DOCUMENTS

| | | |
|---|---|---|
| CN | 104907092 A | 9/2015 |
| EP | 2117707 A1 | 11/2009 |
| EP | 2308596 A1 | 4/2011 |
| GB | 868846 A | 5/1961 |
| WO | 20110125049 A1 | 10/2011 |

OTHER PUBLICATIONS

M. Beale et al: Recent advances in automotive catalysis for NO x emission control by small-pore microporous Chemical Society Reviews, vol. 44, No. 20, Jan. 1, 2015, pp. 7371-7377.

\* cited by examiner

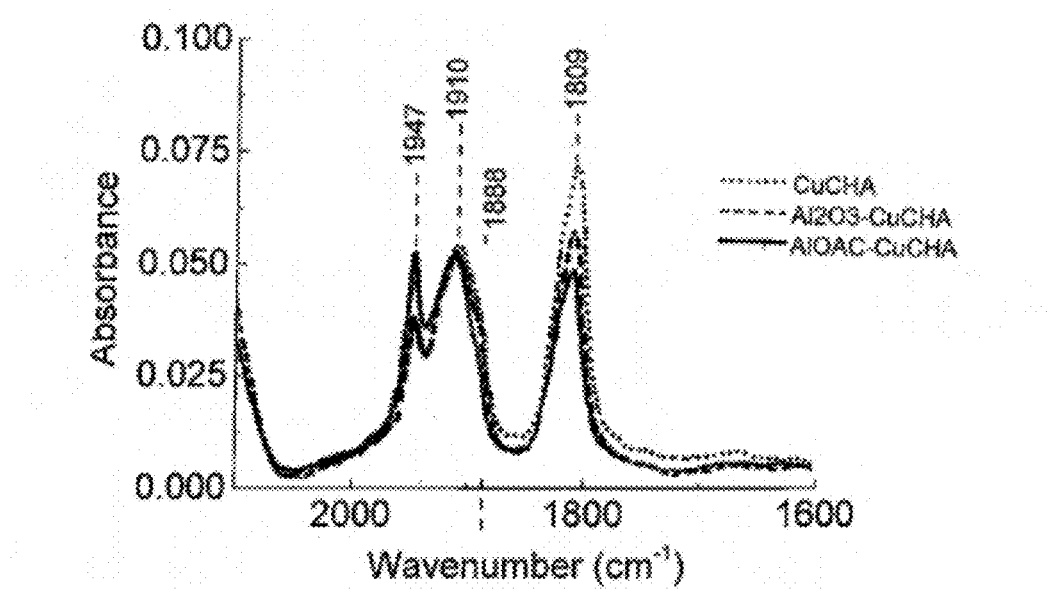
FIG. 7
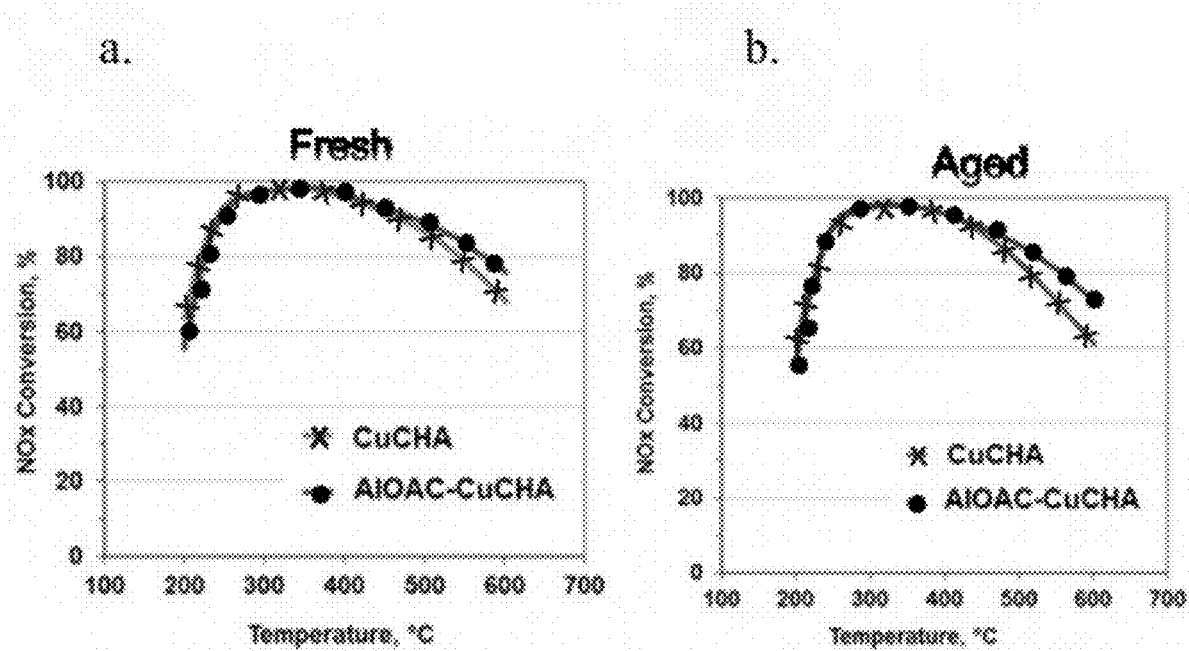
FIG. 8a
FIG. 8b

ION-EXCHANGED MOLECULAR SIEVE CATALYSTS EXHIBITING REDUCED N2O EMISSIONS

CROSS-REFERENCE TO RELATED APPLICATIONS

This application is a continuation of International App. No. PCT/IB2017/051299; filed Mar. 6, 2017, which International Application was published by the International Bureau in English on Sep. 14, 2017, and claims priority to U.S. Provisional Application No. 62/305,141, filed Mar. 8, 2016, each of which is incorporated by reference in their entirety and for all purposes.

FIELD OF THE INVENTION

The present invention relates generally to the field of selective catalytic reduction catalysts and to methods of preparing and using such catalysts to selectively reduce nitrogen oxides.

BACKGROUND OF THE INVENTION

Over time, the harmful components of nitrogen oxides ($NO_x$) have led to atmospheric pollution. $NO_x$ is contained in exhaust gases, such as from internal combustion engines (e.g., in automobiles and trucks), from combustion installations (e.g., power stations heated by natural gas, oil, or coal), and from nitric acid production plants.

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a lower hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

The selective reduction process is referred to as a SCR (Selective Catalytic Reduction) process. The SCR process uses catalytic reduction of nitrogen oxides with a reductant (e.g., ammonia) in the presence of atmospheric oxygen, resulting in the formation predominantly of nitrogen and steam:

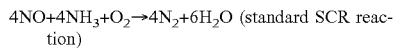
4NO+4NH$_3$+O$_2$→4N$_2$+6H$_2$O (standard SCR reaction)

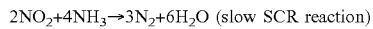
2NO$_2$+4NH$_3$→3N$_2$+6H$_2$O (slow SCR reaction)

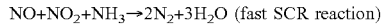
NO+NO$_2$+NH$_3$→2N$_2$+3H$_2$O (fast SCR reaction)

Catalysts employed in the SCR process ideally should be able to retain good catalytic activity over a wide range of temperature conditions of use, for example, 200° C. to 600° C. or higher, under hydrothermal conditions. SCR catalysts are commonly employed in hydrothermal conditions, such as during the regeneration of a soot filter, a component of the exhaust gas treatment system used for the removal of particles.

Unfortunately, many catalysts employed in the SCR process are also able to carry out direct oxidation of ammonia as an undesired side-reaction to generate dinitrogen oxide ($N_2O$):

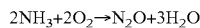
2NH$_3$+2O$_2$→N$_2$O+3H$_2$O

Emissions of dinitrogen oxide into the exhaust gas are partially responsible for the observed greenhouse effect. Therefore, catalysts that minimize the formation of dinitrogen oxide (i.e., $N_2O$ make) would be highly desirable.

Current catalysts employed in the SCR process include molecular sieves such as zeolites, which have been used in the selective catalytic reduction of nitrogen oxides with a reductant such as ammonia, urea, or a hydrocarbon in the presence of oxygen. Zeolites are crystalline materials having rather uniform pore sizes which, depending upon the type of zeolite and the type and amount of cations included in the zeolite lattice, range from about 3 to about 10 Angstroms in diameter. Certain zeolites having 8-ring pore openings and double-six ring secondary building units, particularly those having cage-like structures, have been used as SCR catalysts. A specific type of zeolite having these properties is chabazite (CHA), which is a small pore zeolite with 8 member-ring pore openings (~3.8 Angstroms) accessible through its 3-dimensional porosity. A cage-like structure results from the connection of double six-ring building units by 4 rings.

Metal-promoted zeolite catalysts including, among others, iron-promoted and copper-promoted zeolite catalysts, for the selective catalytic reduction of nitrogen oxides with ammonia are known. For example, iron-promoted zeolite beta has been an effective commercial catalyst for the selective reduction of nitrogen oxides with ammonia. Unfortunately, it has been found that under harsh hydrothermal conditions (e.g., as exhibited during the regeneration of a soot filter with temperatures locally exceeding 700° C.), the activity of many metal-promoted zeolites begins to decline. This decline has been attributed to dealumination of the zeolite and the consequent loss of metal-containing active centers within the zeolite.

Metal-promoted, particularly copper-promoted, aluminosilicate zeolites having the CHA structure type have solicited a high degree of interest as catalysts for the SCR of oxides of nitrogen in lean burning engines using nitrogenous reductants. These materials exhibit activity within a wide temperature window and excellent hydrothermal durability, as described in U.S. Pat. No. 7,601,662. Prior to the discovery of metal promoted zeolites described in U.S. Pat. No. 7,601,662, while a large number of metal-promoted zeolites had been proposed in the patent and scientific literature for use as SCR catalysts, each of the proposed materials suffered from one or both of the following defects: (1) poor conversion of oxides of nitrogen at low temperatures, for example 350° C. and lower; and (2) poor hydrothermal stability marked by a significant decline in catalytic activity in the conversion of oxides of nitrogen by SCR. The invention described in U.S. Pat. No. 7,601,662 addressed a compelling, unsolved need to provide a material that would provide conversion of oxides of nitrogen at low temperatures and retention of SCR catalytic activity after hydrothermal aging at temperatures in excess of 650° C.

Even though the catalysts described in U.S. Pat. No. 7,601,662 exhibit excellent properties, rendering them useful e.g., in the context of SCR catalysis, there is always a desire for improved performance in extended and/or different temperature windows. One of the challenges of meeting current governmental $NO_x$ regulations is the improvement of low temperature performance of the existing Cu-SSZ13 based SCR catalysts (for example, Euro 6). Accordingly, it would be beneficial to provide an SCR catalyst that has improved low and high temperature performance and lower N₂O make versus current Cu-SSZ13-based SCR catalysts.

SUMMARY OF THE INVENTION

The present disclosure generally provides catalysts, catalyst articles and catalyst systems comprising such catalyst articles. In particular, such articles and systems comprise a selective reduction catalyst composition suitable for at least partial conversion of gaseous NOx emissions and a reduction in N₂O make. The selective reduction catalyst composition includes an ion-exchanged metal and at least a promoter metal oxide component ion-exchanged on a porous refractory oxide support that provides an effect on NOx conversion activity. The metal ion-exchanged molecular sieve, such as a metal ion-exchanged CHA zeolite support, is treated with at least one promoter metal precursor to reduce the metal oxide clusters present within the pores and on the outer surface of the molecular sieve. The metal oxide clusters foster N₂O make and are formed either during the ion-exchange process of metal with the molecular sieve or during the calcination of the metal ion-exchanged molecular sieve to activate the catalyst material. The presence of the promoter metal in the zeolite framework provides the catalyst composition of the current invention with a decrease in N₂O make while maintaining NOx conversion efficiency compared to catalyst compositions with no promoter metal.

In one aspect of the current invention, a catalyst composition comprising a metal ion-exchanged molecular sieve, which includes an ion-exchanged metal within at least a portion of the exchange sites of the molecular sieve, wherein the ion-exchanged metal is selected from the group consisting of Cu, Co, Ni, La, Mn, Fe, V, Ag, Ce, Nd, Pr, Ti, Cr, Zn, Nb, Mo, Hf, Y, W, and a combination thereof, and further includes a promoter metal on or in the molecular sieve, wherein at least a portion of the promoter metal is located on the surface of the sieve or in an intra-pore site other than an exchange site. In one embodiment, the ion-exchanged metal and the promoter metal are not the same metal. In another embodiment, the ion-exchanged metal is copper. In one embodiment, the molecular sieve has a structure type selected from AEI, AFT, AFX, CHA, EAB, ERI, KFI, LEV, LTN, MSO, SAS, SAT, SAV, SFW, and TSC. In another embodiment, the molecular sieve has a pore size of about 3 to about 5 Angstroms. In a further embodiment, the molecular sieve has the CHA structure type and is an aluminosilicate zeolite. In another embodiment, the CHA crystal structure is selected from a group consisting of SSZ-13, SSZ-62, natural chabazite, zeolite K-G, Linde D, Linde R, LZ-218, LZ-235, LZ-236, ZK-14, SAPO-34, SAPO-4, SAPO-47, and ZYT-6. In another embodiment, the molecular sieve has a silica-to alumina ratio (SAR) of about 5 to about 100. In another embodiment, the molecular sieve has a silica-to alumina ratio (SAR) of about 10 to about 40.

In one or more embodiments, the ion-exchanged metal is present in the catalyst composition in an amount of from about 0.01% to about 15% by weight, based on the total weight of the ion-exchanged molecular sieve, calculated as metal oxide. For example, in one embodiment, the ion-exchanged metal is copper and present in the catalyst composition in an amount of from about 0.01% to about 4.0% by weight, based on the total weight of the ion-exchanged molecular sieve, calculated as copper oxide (CuO).

In another embodiment, the promoter metal is present in the catalyst composition in an amount of from about 0.01% to about 15% by weight, based on the total weight of the ion-exchanged molecular sieve, calculated as metal oxide. For example, in some embodiments, the promoter metal is aluminum and present in an amount of about 2% by weight to about 10% by weight, based on the total weight of the ion-exchanged molecular sieve, calculated as aluminum oxide ($Al_2O_3$). In further embodiments, the promoter metal is selected from the group consisting of alkali metals, alkaline earth metals, transition metals in Groups IIIB, IVB, VB, VIB VIIB, VIIIB, IB, and IIB, Group IIIA elements, Group IVA elements, lanthanides, actinides and a combination thereof. For example, in some embodiment, the promoter metal is selected from aluminum, iron, copper, zirconium, and a combination thereof.

In one embodiment, the metal ion-exchanged molecular sieve of the catalyst composition exhibits a decrease in absorbance at 3733 $cm^{-1}$ using FTIR spectroscopy in an amount from about 10% to about 50% compared to a catalyst composition having the same ion-exchanged metal at the same loading but no promoter metal. In another embodiment, the metal ion-exchanged molecular sieve of a catalyst composition exhibits a decrease in the absorbance at 1888 $cm^{-1}$ using NO/DRIFT FTIR spectroscopy in an amount from about 5% to about 50% compared to a catalyst composition having the same ion-exchanged metal at the same loading but no promoter metal.

Another aspect of the invention describes a method for reducing the number or size of metal oxide clusters present in a molecular sieve framework of a modified metal ion-exchanged molecular sieve catalyst comprising:
  receiving a metal ion-exchanged molecular sieve composition, wherein said composition includes an ion-exchanged metal within at least a portion of the exchange sites of the molecular sieve;
  treating the ion-exchanged molecular sieve with at least one promoter metal salt, wherein the metal salt contains a metal selected from aluminum, iron, copper, zirconium, and a combination thereof, to generate a modified metal ion-exchange molecular sieve, such that at least a portion of the metal from the metal salt is located on the external surface of the sieve or in an intra-pore site other than an exchange site; and
  calcining the modified metal ion-exchanged molecular sieve to afford an activated modified metal ion-exchanged molecular sieve catalyst.

In some embodiments, the ion-exchange step of the above method comprises combining the metal ion-exchanged molecular sieve with a promoter metal precursor in a washcoat solution adapted for coating a catalyst substrate having a plurality of channels adapted for gas flow. In another embodiment, the washcoat suspension is applied to a catalyst substrate, and the catalyst substrate is subsequently calcined.

Another aspect of the invention describes a method of making a metal ion-exchanged molecular sieve composition containing an ion-exchanged metal and at least one promoter metal therein comprising the following steps:
  contacting a molecular sieve with a metal precursor in a solution to promote ion exchange and form a metal ion-exchanged molecular sieve, wherein said metal ion-exchanged molecular sieve includes an ion-exchanged metal within at least a portion of the exchange sites of the molecular sieve;
  either before or after said contacting step, treating the molecular sieve with a promoter metal precursor to form a modified molecular sieve, wherein said modified molecular sieve includes at least a portion of the promoter metal located on the external surface of the sieve or in an intra-pore site other than an exchange site;

drying the metal ion-exchanged molecular sieve containing ion-exchanged metal and a promoter metal ion-exchanged therein; and calcining the metal ion-exchanged molecular sieve.

In one embodiment, the ion-exchanged metal precursor and the promoter metal precursor of the above described method are each in the form of a metal salt. In another embodiment, the metal salts are independently selected from a nitrate, acetate, phosphate and a combination thereof. In another embodiment, the metal of the ion-exchanged metal precursor is copper. In another embodiment, the promoter metal precursor is selected from zirconium (IV) dihydrogenphosphate, copper (II) acetate, iron (II) acetate, aluminum acetate dibasic, and a combination thereof. In further embodiments, the concentration of the promoter metal precursor is about 0.1 wt. % to about 50 wt. % relative to the weight of the metal ion-exchanged molecular sieve. In another embodiment, the metal ion-exchange molecular sieve is heated with the promoter metal precursor in a solution at elevated temperature. In some embodiments, the solution is an aqueous solution. In another embodiment, the metal ion-exchanged molecular sieve is calcined at a temperature of about 500° C. to about 800° C.

In another aspect, a catalyst article comprising a catalyst substrate having a plurality of channels adapted for gas flow, each channel has a wall surface upon which a washcoat is disposed. In one embodiment, the catalyst substrate is a honeycomb. In another embodiment, the honeycomb comprises a wall flow filter substrate. In another embodiment, the honeycomb comprises a flow through substrate. In one embodiment, the catalyst is applied to the substrate with a loading of at least about 1.0 g/in$^3$.

In another aspect, a method for reducing NOx level in an exhaust gas comprising contacting the gas with a catalyst composition for a time and temperature sufficient to reduce the level of NOx in the gas is described. In one embodiment, the NOx level in the exhaust gas is reduced to $N_2$ at a temperature between 200° C. to about 600° C. In another embodiment, the NOx level in the exhaust gas is reduced by at least 50% at 200° C. In a further embodiment, the NOx level in the exhaust gas is reduced by at least 70% at 600° C. In some embodiments, the catalyst is a selective reduction catalyst (SCR).

Another aspect of the invention is a method for reducing NOx level in an exhaust gas comprising contacting the gas with a catalyst article for a time and temperature sufficient to reduce the level of NOx in the gas and wherein $N_2O$ make is decreased in an amount of about 10% to about 75% compared to a catalyst article comprising the same ion-exchanged metal at the same loading as said catalyst article but no promoter metal.

Another aspect of the invention is an emission treatment system for treatment of an exhaust gas stream, the emission treatment system comprising:

an engine producing an exhaust gas stream;

a catalyst article according to the invention positioned downstream from the engine in fluid communication with the exhaust gas stream and adapted for the reduction of NOx within the exhaust stream to form a treated exhaust gas stream; and an injector adapted for the addition of a reductant to the exhaust gas stream to promote reduction of NOx to $N_2$ and water as the exhaust gas stream is exposed to the catalyst article according to the invention.

In some embodiment, the emission treatment system includes a diesel engine. In another embodiment, the exhaust emission treatment system further comprises a diesel oxidation catalyst. In another embodiment, the reductant comprises ammonia or an ammonia precursor.

The invention includes, without limitation, the following embodiments.

Embodiment 1: A catalyst composition comprising a metal ion-exchanged molecular sieve, comprising an ion-exchanged metal within at least a portion of the exchange sites of the molecular sieve, wherein the ion-exchanged metal is a rare-earth metal or a transition metal, and a combination thereof, and further comprising a promoter metal on or in the molecular sieve, wherein at least a portion of the promoter metal is located on a surface of the sieve or in an intra-pore site other than an exchange site, and wherein the ion-exchange metal and promoter metal are not the same metal.

Embodiment 2: The catalyst composition of any preceding or subsequent embodiment, wherein the ion-exchanged metal is selected from the group consisting of Cu, Co, Ni, La, Mn, Fe, V, Ag, Ce, Nd, Pr, Ti, Cr, Zn, Nb, Mo, Hf, Y, and W.

Embodiment 3: The catalyst composition of any preceding or subsequent embodiment, wherein the molecular sieve is a small pore molecular sieve comprising an 8-ring pore opening structure having a pore size of about 3 to about 5 Angstroms.

Embodiment 4: The catalyst composition of any preceding or subsequent embodiment, wherein the molecular sieve has a structure type selected from AEI, AFT, AFX, CHA, EAB, ERI, KFI, LEV, LTN, MSO, SAS, SAT, SAV, SFW, and TSC.

Embodiment 5: The catalyst composition of any preceding or subsequent embodiment, wherein said molecular sieve has a CHA structure type and wherein the CHA structure is an aluminosilicate zeolite having a silica-to alumina ratio (SAR) of about 5 to about 100.

Embodiment 6: The catalyst composition of any preceding or subsequent embodiment, wherein the ion-exchanged metal is present in said catalyst composition in an amount of from about 0.01% to about 15.0% by weight, based on the total weight of the ion-exchanged molecular sieve, calculated as metal oxide.

Embodiment 7: The catalyst composition of any preceding or subsequent embodiment, wherein the ion-exchanged metal is copper and present in said catalyst composition in an amount of from about 0.01% to about 4.0% by weight, based on the total weight of the ion-exchanged molecular sieve, calculated as copper oxide (CuO).

Embodiment 8: The catalyst composition of any preceding or subsequent embodiment, wherein the promoter metal is present in said catalyst composition in an amount of from about 0.01% to about 15.0% by weight, based on the total weight of the ion-exchanged molecular sieve, calculated as metal oxide.

Embodiment 9: The catalyst composition of any preceding or subsequent embodiment, wherein the promoter metal is aluminum and present in said catalyst composition in an amount of from about 2.0% to about 10.0% by weight, based on the total weight of the ion-exchanged molecular sieve, calculated as aluminum oxide ($Al_2O_3$).

Embodiment 10: The catalyst composition of any preceding or subsequent embodiment, wherein the promoter metal is selected from the group consisting of alkali metals, alkaline earth metals, transition metals in Groups IIIB, IVB, VB, VIB VIIB, VIIIB, IB, and IIB, Group IIIA elements, Group IVA elements, lanthanides, actinides, and a combination thereof.

Embodiment 11: The catalyst composition of any preceding or subsequent embodiment, wherein the metal ion-exchanged molecular sieve exhibits a decrease in absorbance at 3733 cm$^{-1}$ using FTIR spectroscopy in an amount from about 10% to about 50% compared to a catalyst composition having the same ion-exchanged metal at the same loading but no promoter metal.

Embodiment 12: The catalyst composition of any preceding or subsequent embodiment, wherein the metal ion-exchanged molecular sieve comprises copper as an ion-exchanged metal and aluminum as a promoter metal exhibits a decrease in absorbance compared to a catalyst composition having copper as the ion-exchanged metal and no promoter metal.

Embodiment 13: The catalyst composition of any preceding or subsequent embodiment, wherein the metal ion-exchanged molecular sieve exhibits a decrease in the absorbance at 1888 cm$^{-1}$ using NO/DRIFT FTIR spectroscopy in an amount from about 5% to about 50% compared to a catalyst composition having the same ion-exchanged metal at the same loading but no promoter metal.

Embodiment 14: A method for reducing the number or size of metal oxide clusters present in a molecular sieve framework of a modified metal ion-exchanged molecular sieve catalyst comprising: receiving a metal ion-exchanged molecular sieve composition, wherein said composition includes an ion-exchanged metal within at least a portion of the exchange sites of the molecular sieve; treating said metal ion-exchanged molecular sieve with at least one promoter metal precursor, wherein the metal precursor contains a metal selected from aluminum, iron, copper, zirconium, and a combination thereof, to generate a modified metal ion-exchanged molecular sieve composition, such that at least a portion of the metal from the metal precursor is located on a surface of the sieve or in an intra-pore site other than an exchange site; and calcining the modified metal ion-exchanged molecular sieve composition to afford an activated modified metal ion-exchanged molecular sieve catalyst.

Embodiment 15: The method of any preceding or subsequent embodiment, wherein said treating step comprises combining the metal ion-exchanged molecular sieve with at least one promoter metal precursor in a washcoat suspension adapted for coating a catalyst substrate having a plurality of channels adapted for gas flow.

Embodiment 16: The method of any preceding or subsequent embodiment, further comprising applying the washcoat suspension to a catalyst substrate, and wherein said calcining step comprises calcining the catalyst substrate.

Embodiment 17: A method of making a metal ion-exchanged molecular sieve composition containing an ion-exchanged metal and at least one promoter metal therein comprising the following steps: contacting a molecular sieve with metal precursor in a solution to promote ion exchange and form a metal ion-exchanged molecular sieve, wherein said metal ion-exchanged molecular sieve includes an ion-exchanged metal within at least a portion of the exchange sites of the molecular sieve; either before or after said contacting step, treating the molecular sieve with a promoter metal precursor to form a modified molecular sieve, wherein said modified molecular sieve includes at least a portion of the promoter metal located on a surface of the sieve or in an intra-pore site other than an exchange site; drying the metal ion-exchanged molecular sieve containing ion-exchanged metal and a promoter metal ion-exchanged therein; and calcining the metal ion-exchanged molecular sieve.

Embodiment 18: The method of any preceding or subsequent embodiment, wherein the ion-exchanged metal precursor and the promoter metal precursor are each in the form of a metal salt.

Embodiment 19: The method of any preceding or subsequent embodiment, wherein the metal of the ion-exchanged metal precursor is copper.

Embodiment 20: The method of any preceding or subsequent embodiment, wherein the promoter metal precursor are independently selected from zirconium (IV) dihydrogenphosphate, copper (II) acetate, iron (II) acetate, aluminum acetate dibasic, and a combination thereof.

Embodiment 21: The method of any preceding or subsequent embodiment, wherein the concentration of the promoter metal precursor is about 0.1 wt. % to about 50 wt. % relative to the weight of the metal ion-exchanged molecular sieve.

Embodiment 22: The method of any preceding or subsequent embodiment, further comprising heating the molecular sieve with the promoter metal precursor in a solution at elevated temperature, wherein the solution is an aqueous solution.

Embodiment 23: The method of any preceding or subsequent embodiment, wherein the metal ion-exchanged molecular sieve is calcined at a temperature of about 500° C. to about 800° C.

Embodiment 24: A catalyst article comprising a catalyst substrate having a plurality of channels adapted for gas flow, each channel having a washcoat dispersed therein, the washcoat comprising the catalyst composition of any preceding or subsequent embodiment.

Embodiment 25: The catalyst article of any preceding or subsequent embodiment, wherein the catalyst substrate is a honeycomb, wherein the honeycomb substrate is a wall flow filter substrate or a flow through substrate.

Embodiment 26: The catalyst article of any preceding or subsequent embodiment, wherein said catalyst is applied to the substrate with a loading of at least about 1.0 g/in$^3$.

Embodiment 27: A method for reducing NOx level in an exhaust gas comprising contacting the gas with a catalyst composition of any preceding or subsequent embodiment for a time and temperature sufficient to reduce the level of NOx in the gas.

Embodiment 28: The method of any preceding or subsequent embodiment, wherein said NOx level in the exhaust gas is reduced to $N_2$ at a temperature between 200° C. to about 600° C. and wherein one or more of: (a) said NOx level in the exhaust gas is reduced by at least 50% at 200° C.; and (b) wherein said NOx level in the exhaust gas is reduced by at least 70% at 600° C.

Embodiment 29: A method for reducing NOx level in an exhaust gas comprising contacting the gas with a catalyst article of any preceding or subsequent embodiment for a time and temperature sufficient to reduce the level of NOx in the gas and wherein $N_2O$ make is decreased in an amount of about 10% to about 75% compared to a catalyst article comprising the same ion-exchanged metal at the same loading as said catalyst article but no promoter metal.

Embodiment 30: An emission treatment system for treatment of an exhaust gas stream, the emission treatment system comprising: (a) an engine producing an exhaust gas stream; (b) a catalyst article of any preceding and subsequent embodiment positioned downstream from the engine in fluid communication with the exhaust gas stream and adapted for the reduction of NOx within the exhaust stream to form a treated exhaust gas stream; and (c) an injector adapted for the addition of a reductant to the exhaust gas stream to promote reduction of NOx to $N_2$ and water as the exhaust gas stream is exposed to the catalyst article, wherein the reductant comprises ammonia or an ammonia precursor.
Embodiment 31: The emission treatment system of any preceding or subsequent embodiment, wherein the engine is a diesel engine.
Embodiment 32: The emission treatment system of any preceding or subsequent embodiment, further comprising a diesel oxidation catalyst.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

FIG. 5a shows a bar graph comparing aluminum modified copper ion exchanged CHA zeolite catalyst composition (5% loading, based on $Al_2O_3$) with the $NH_4^+$-CHA zeolite with alumina reference material; and FIG. 5b shows a bar graph comparing aluminum modified copper ion exchanged CHA zeolite catalyst composition (10% loading, based on $Al_2O_3$) with the $NH_4^+$-CHA zeolite with alumina reference material;

FIG. 7 is a graph showing in-situ NO/DRIFT spectra of a copper ion-exchanged CHA zeolite modified with insoluble alumina ($Al_2O_3$—CuCHA), a copper ion-exchanged CHA zeolite modified with soluble alumina (AlOAc—CuCHA) at 2% loading based on $Al_2O_3$, and a copper ion-exchanged CHA zeolite without any further modification (CuCHA);

FIGS. 8a and 8b are panels showing NOx conversion in SCR testing, wherein FIG. 8a shows a line graph of NOx conversion of fresh aluminum modified copper ion-exchanged CHA zeolite AlOAc—CuCHA and fresh aluminum free copper ion-exchanged CHA zeolite CuCHA in SCR testing; and FIG. 8b shows a line graph of NOx conversion of aged aluminum modified copper ion-exchanged CHA zeolite AlOAc—CuCHA and aged aluminum free copper ion-exchanged CHA zeolite CuCHA in SCR testing; and FIGS. 9a and 9b are panels showing the $N_2O$ make in SCR testing, wherein FIG. 9a shows a line graph of $N_2O$ make of fresh aluminum modified copper ion-exchanged CHA zeolite AlOAc—CuCHA and fresh aluminum free copper ion-exchanged CHA zeolite CuCHA in SCR testing; and FIG. 9b shows a line graph of $N_2O$ make of aged aluminum modified copper ion-exchanged CHA zeolite AlOAc—CuCHA and aged aluminum free copper ion-exchanged CHA zeolite CuCHA in SCR testing.

DETAILED DESCRIPTION OF THE PREFERRED EMBODIMENTS

Figure 1:
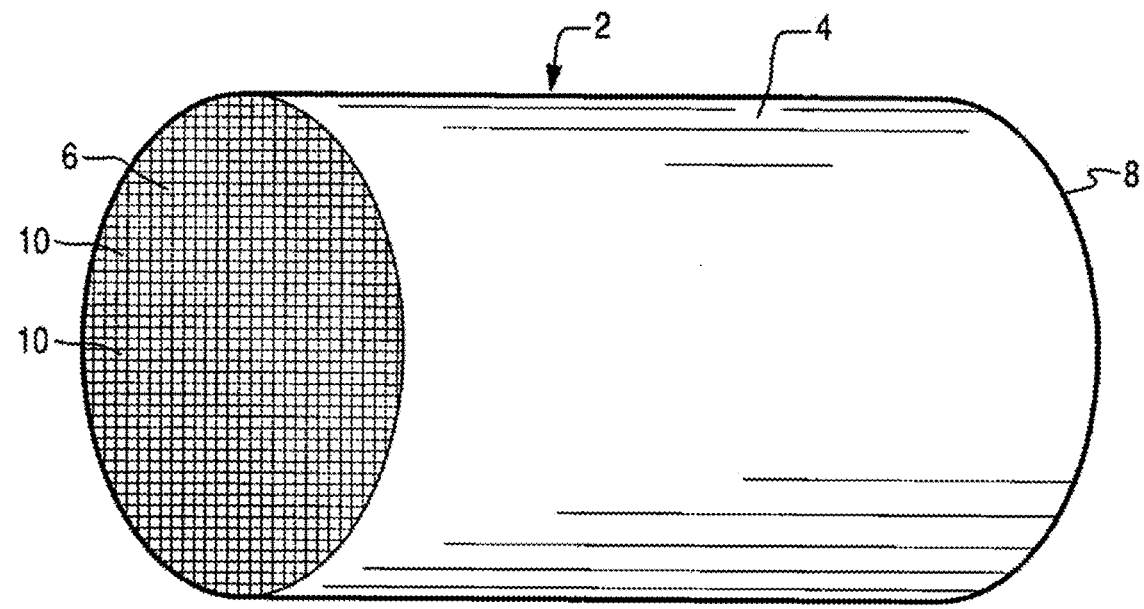
FIG. 1 is a perspective view of a honeycomb-type substrate carrier which may comprise a catalyst article (i.e., selective reduction catalyst (SRC)) washcoat composition in accordance with the present invention.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present invention provides a selective reduction catalyst (SRC) composition suitable for at least partial conversion of gaseous NOx emissions and a reduction in $N_2O$ make. The SRC composition includes a metal ion-exchanged molecular sieve and at least one promoter metal oxide component that provides an effect on NOx conversion activity. The metal ion-exchanged molecular sieve, such as a metal ion-exchanged CHA zeolite support, is treated with at least one promoter metal precursor to reduce the metal oxide clusters present within the pores and on the outer surface of the molecular sieve. The metal oxide clusters foster $N_2O$ make and are formed either during the ion-exchange process of metal with the molecular sieve or during the calcination of the metal ion-exchanged molecular sieve to activate the catalyst material. The presence of the promoter metal in the molecular sieve framework provides the catalyst composition of the current invention with a decrease in $N_2O$ make while maintaining NOx conversion efficiency compared to catalyst compositions with no promoter metal.

The SRC composition can be prepared using metal ion-exchange processes rather than incipient wetness impregnation techniques and coated onto a catalyst substrate using a washcoat technique as set forth more fully below.

Ion exchange is a process commonly used for exchanging ions residing in a porous support with an outside metal ion of interest. For example, zeolites prepared with sodium ions residing in the pores can be exchanged with a different ion to form an ion-exchanged porous support. This is accomplished by preparing a slurry of the porous support, i.e., zeolite, in a solution containing the outside metal ion of interest to be exchanged. Heat may be optionally applied during this process. The outside metal ion can now diffuse into the pores of the support and exchange with the residing ion, i.e., sodium, to form the metal-ion exchanged porous support.

However unlike the ion exchange process, incipient wetness impregnation techniques, also called capillary impregnation or dry impregnation, commonly used for the synthesis of heterogeneous materials, i.e., catalysts, do not require the presence of any residing ions in the starting material. Typically, a metal precursor is dissolved in an aqueous or organic solution and then the metal-containing solution is added to a catalyst support, i.e., zeolite, containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to drive off the volatile components within the solution, depositing the metal on the catalyst surface. The maximum loading is limited by the solubility of the precursor in the solution. The concentration profile of the impregnated material depends on the mass transfer conditions within the pores during impregnation and drying.

As used herein, the term "selective catalytic reduction" (SCR) refers to the catalytic process of reducing oxides of nitrogen to dinitrogen ($N_2$) using a nitrogenous reductant (e.g., ammonia, urea, and the like).

As used herein, the term "catalyst" or "catalyst composition" refers to a material that promotes a reaction. As used herein, the phrase "catalyst system" refers to a combination of two or more catalysts, for example a combination of a first SCR catalyst and a second SCR catalyst. The catalyst system may be in the form of a washcoat in which the two SCR catalysts are mixed together.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

As used herein, the term "substrate" refers to the monolithic material onto which the catalyst composition is placed, typically in the form of a washcoat containing a plurality of particles containing a catalytic composition thereon. A washcoat is formed by preparing a slurry containing a certain solid content (e.g., 30-90% by weight) of particles in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

As used herein, the term "catalyst article" refers to an element that is used to promote a desired reaction. For example, a catalyst article may comprise a washcoat containing catalytic compositions on a substrate. The catalyst article may be "fresh" meaning it is new and has not been exposed to any heat or thermal stress for a prolonged period of time. "Fresh" may also means that the catalyst was recently prepared and has not been exposed to any exhaust gases. Likewise, an "aged" catalyst article is not new and has been exposed to exhaust gases and elevated temperature (i.e. greater than 500° C.) for a prolonged period of time (i.e., greater than 3 hours).

The term "abate" means to decrease in amount and "abatement" means a decrease in the amount, caused by any means.

The term "ion-exchanged metal" refers to one or more metals added to a molecular sieve using ion exchange processes, that is the ion-exchanged metal is exchanged with for example a hydrogen or sodium ion located within the pores of the molecular sieve. The ion-exchanged metal is added to the molecular sieve to enhance the catalytic activity of the molecular sieve compared to molecular sieves that do not contain the ion-exchanged metal. The ion-exchanged metal actively participates in the promotion of a chemical reaction, e.g., copper participates in the conversion of nitrogen oxides, and is therefore often referred to as the active metal.

The term "promoter metal(s)" refers to one or more metals added to an ion-exchanged molecular sieve to generate a modified "metal-promoted" molecular sieve. The promoter metal is added to the ion-exchanged molecular sieve to enhance the catalytic activity of the active metal residing at the exchange site in the molecular sieve compared to ion-exchanged molecular sieves that do not contain a promoter metal, e.g., the addition of aluminum as a promoter metal to a copper ion-exchanged molecular sieve enhances the catalytic activity of copper by preventing and/or reducing the formation of catalytically less active copper oxide clusters.

As used herein, "impregnated" or "impregnation" refers to permeation of the catalytic material into the porous structure of the support material.

As used herein, the term "intra-pore site" refers to sites available for cations within the pore structure of zeolites. Zeolites are microporous solids containing pores and channels of various dimensions. A wide variety of cations can occupy these pores and can move through these channels. Intra-pore sites refer to all the internal spaces within the pore structure of the zeolite that can be occupied by cations such as for example exchange sites and/or defect sites. "Exchange sites" refers to sites available for cations, which are mainly occupied by ion-exchanged metal cations, which are intentionally added to the zeolite in order to promote a chemical reaction and are often referred to as the active metal. "Defect sites" refer to intra-pore sites, where part of the Al—O—Al framework of the zeolite has been damaged such that Al—O bonds have been broken and have been replaced with silanol functional groups (e.g, at least one but no more than four silanol groups, Al—OH) to generate an empty space or cavity. These sites are often occupied by copper oxide molecules with much weaker interaction and upon heating these ions easily move away forming metal oxide clusters.

As used therein, the term "pseudo crystalline" refers to a substance that appears to be crystalline, even under a microscope, but does not have a true crystalline diffraction pattern.

Catalyst Composition

The SRC composition includes a metal ion-exchanged molecular sieve modified with at least one promoter metal. In certain embodiments, the combination of ion-exchanged metal and the promoter metal onto the molecular sieve is expressed as a weight ratio of the corresponding metal oxides and ranges from about 1:10 to about 10:1. The concentration of ion-exchanged metal present in the metal ion-exchanged molecular sieve can vary, but will typically be from about 0.1 wt. % to about 15 wt. % relative to the weight of the final ion-exchanged molecular sieve, i.e., the molecular sieve containing the ion-exchanged metal and the promoter metal, calculated as metal oxide. Likewise, the concentration of the promoter metal present in the metal ion-exchanged molecular sieve can also vary, but will typically be from about 0.1 wt. % to about 15 wt. % relative to the weight of the final ion-exchanged molecular sieve calculated as the metal oxide. In some embodiments, copper is selected as the metal and is present in the copper ion-exchanged molecular sieve at a concentration from about 0.1 wt. % to about 4 wt. % relative to the weight of the molecular sieve, calculated as copper oxide. In some embodiments, aluminum is selected as the promoter metal and is present in the modified copper ion-exchanged molecular sieve in an amount ranging from about 2 wt. % to about 10 wt. % relative to the weight of the final ion-exchanged molecular sieve and calculated as aluminum oxide ($Al_2O_3$). In further embodiments, the molecular sieve is a chabazite (CHA) zeolite support. Although not bound by a theory of operation, it is believed and suggested by experiments, that incorporating a promoter metal into the zeolite can displace the ion-exchanged metal oxide molecules associated with the silanol groups present on the surface of the zeolite as well as in the intra-pore sites, i.e., as defect sites, from aggregating to form metal oxide clusters and encourage migration of the ion-exchanged metal oxide molecules to desired locations (i.e., exchange sites) within the zeolite. As such the formation of ion-exchange metal oxide clusters that are less catalytically active or less selective for $NO_x$ reduction can be reduced.

The ion-exchanged metal is intentionally added to the molecular sieves to enhance the catalytic activity of the molecular sieves compared to molecular sieves that do not have a metal intentionally ion-exchanged. In order to enhance the SCR of oxides of nitrogen, in one or more embodiments, a suitable metal is exchanged into the molecular sieve component. Accordingly, the molecular sieve of one or more embodiments may be subsequently ion-exchanged with one or more ion-exchanged or active metals such as copper (Cu), cobalt (Co), nickel (Ni), lanthanum (La), manganese (Mn), iron (Fe), vanadium (V), silver (Ag), and cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), and tungsten (W). In specific embodiments, the molecular sieve component is ion-exchanged with Cu.

As mentioned previously, the ion-exchanged metal content of the molecular sieve component, calculated as the oxide, is, in one or more embodiments, at least about 0.1 wt. % based on the weight of the final ion-exchanged molecular sieve, reported on a volatile-free basis. In one or more embodiments, the ion-exchanged metal is present in an amount in the range of about 1% to about 15% by weight, based on the final weight of the ion-exchanged molecular sieve. In one or more specific embodiments, the ion-exchanged metal comprises Cu, and the Cu content, calculated as CuO is in the range of up to about 10 wt. %, including about 9, about 8, about 7, about 6, about 5, about 4, about 3, about 2, about 1, about 0.5, and about 0.1 wt. %, on an oxide basis, in each case based on the weight of the final ion-exchanged molecular sieve and reported on a volatile free basis.

The promoter metal can be selected from the group consisting of alkali metals, alkaline earth metals, transition metals in Groups IIIB, IVB, VB, VIB VIIB, VIIIB, IB, and IIB, Group IIIA elements, Group IVA elements, lanthanides, actinides and a combination thereof. In one embodiment, the additional metal is selected from aluminum, iron, copper, zirconium, and a combination thereof.

As mentioned previously, the promoter metal content of the molecular sieve component, calculated as the oxide, is, in one or more embodiments, at least about 0.1 wt. % based on the weight of the final ion-exchanged molecular sieve, reported on a volatile-free basis. In one or more embodiments, the promoter metal is present in an amount in the range of about 1% to about 10% by weight, based on the weight of the final ion-exchanged molecular sieve. In one or more specific embodiments, the promoter metal comprises Al, and the Al content, calculated as $Al_2O_3$ is in the range of up to about 10 wt. %, including about 9, about 8, about 7, about 6, about 5, about 4, about 3, about 2, about 1, about 0.5, and about 0.1 wt. %, on an oxide basis, in each case based on the weight of the final ion-exchanged molecular sieve component and reported on a volatile free basis.

The molecular sieves of the current invention refer to support materials such as zeolites and other framework materials (e.g. isomorphously substituted materials), which may be in particulate form, and in combination with one or more ion-exchanged metals, used as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. Zeolites refer to a specific example of a molecular sieve, which include silicon and aluminum atoms and include materials such as aluminosilicates and aluminophosphates. According to one or more embodiments, it will be appreciated that by defining the molecular sieves by their structure type, it is intended to include the structure type and any and all isotopic framework materials such as SAPO, ALPO, and MeAPO materials having the same structure type as the zeolite materials.

In more specific embodiments, reference to an aluminosilicate zeolite structure type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, which include aluminum and phosphate atoms within the zeolite framework.

Zeolites are crystalline materials having rather uniform pore sizes which, depending upon the type of zeolite and the type and amount of cations included in the zeolite lattice, range from about 3 to 10 Angstroms in diameter. Zeolites generally comprise silica to alumina (SAR) molar ratios of 2 or greater.

Aluminosilicates generally comprise open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

In one or more embodiments, the small-pore molecular sieve comprises $SiO_4/AlO_4$ tetrahedra and is linked by common oxygen atoms to form a three-dimensional network. In other embodiments, the molecular sieve component comprises $SiO_4/AlO_4/PO_4$ tetrahedra. The small-pore molecular sieve of one or more embodiments is differentiated mainly according to the geometry of the voids which are formed by the rigid network of the $(SiO_4)/AlO_4$, or $SiO_4/AlO_4/PO_4$, tetrahedra. The entrances to the voids are formed from 6, 8, 10, or 12 ring atoms with respect to the atoms which form the entrance opening. In one or more embodiments, the molecular sieve comprises ring sizes of no larger than 8, including 6 and 8.

According to one or more embodiments, the molecular sieve can be based on the framework topology by which the structures are identified. Typically, any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the molecular sieve comprises an 8-ring small pore aluminosilicate zeolite. As used herein, "small pore" refers to pore openings which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4 rings. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the molecular sieve is a small-pore molecular sieve having a pore structure and a maximum ring size of eight tetrahedral atoms. In other embodiments, the small-pore molecular sieve comprises a d6r unit. Thus, in one or more embodiments, the small-pore molecular sieve has a structure type selected from AEI, AFT, AFX, CHA, EAB, ERI, KFI, LEV, LTN, MSO, SAS, SAT, SAV, SFW, TSC, and combinations thereof. In other specific embodiments, the molecular sieve has a structure type selected from the group consisting of CHA, AEI, AFX, ERI, KFI, LEV, and combinations thereof. In still further specific embodiments, the small-pore molecular sieve has a structure type selected from CHA, AEI, and AFX. In one or more very specific embodiments, the small-pore molecular sieve component has the CHA structure type.

In one or more embodiments, the molecular sieves include chabazite (CHA) crystal structure zeolites and are selected from an aluminosilicate zeolite, a borosilicate, a gallosilicate, a SAPO, and ALPO, a MeAPSO, and a MeAPO. In some embodiments, the CHA crystal structure is an aluminosilicate zeolite. Aluminosilicate zeolites can have a crystalline or pseudo crystalline structure and may include framework metals other than aluminum (i.e., metal-substituted), such as silico-aluminophosphates (SAPOs). Natural as well as synthetic zeolites may also be used, but synthetic zeolites are preferred because these zeolites have more uniform silica-alumina ratio (SAR), crystallite size, and crystallite morphology, and have fewer and less concentrated impurities (e.g. alkaline earth metals). For example, in some embodiments, zeolitic chabazite includes a naturally occurring tectosilicate mineral of a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538, which is hereby incorporated by reference. Synthesis of a synthetic form of a molecular sieve having the chabazite crystal structure, silicoaluminophosphate 34 (SAPO-34), is described in U.S. Pat. Nos. 4,440,871 and 7,264,789, which are hereby incorporated by reference. A method of making yet another synthetic molecular sieve having chabazite structure, SAPO-44, is described in U.S. Pat. No. 6,162,415, which is hereby incorporated by reference.

Specific zeolites having the CHA structure that are useful in the present invention include, but are not limited to SSZ-13, SSZ-62, natural chabazite, zeolite K-G, Linde D, Linde R, LZ-218, LZ-235, LZ-236, ZK-14, SAPO-34, SAPO-44, SAPO-47, CuSAPO-34, CuSAPO-44, CuSAPO-47, and ZYT-6.

The zeolite is typically present in the form of a highly crystalline material, the material being at least about 75% crystalline, at least about 80% crystalline, at least about 85% crystalline, at least about 90% crystalline, at least about 95% crystalline, at least about 98% crystalline, at least about 99% crystalline, or at least about 99.5% crystalline.

The particle size of the zeolite can vary. Generally the particle size of CHA zeolite can be characterized by a D90 particle size of about 10 to about 40 microns, preferably about 10 to about 30 microns, more preferably 10 microns to about 20 microns. D90 is defined as the particle size at which 90% of the particles have a finer particle size.

Zeolite support material typically exhibits a BET surface area in excess of 60 m$^2$/g, often up to about 200 m$^2$/g or higher. "BET surface area" has its usual meaning of referring to the Brunauer, Emmett, Teller method for determining surface area by N$_2$ adsorption. In one or more embodiments the BET surface area is at least about 200 m$^2$/g, or at least about 400 m$^2$/g, or at least about 600 m$^2$/g.

The ratio of silica to alumina of an aluminosilicate molecular sieve can vary over a wide range. In one or more embodiments, the molecular sieve has a silica to alumina molar ratio (SAR) in the range of 2 to 300, including 5 to 250; 5 to 200; 5 to 100; and 5 to 50. In one or more specific embodiments, the molecular sieve has a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

In one or more specific embodiments, the small-pore molecular sieve has the CHA structure type and has a silica-to-alumina ratio of from 2 to 300, including 5 to 250, 5 to 200, 5 to 100, and 5 to 50; 10 to 200, 10 to 100, 10 to 75, 10 to 60, and 10 to 40; 15 to 100, 15 to 75, 15 to 60, and 15 to 50; 20 to 100, 20 to 75, 20 to 60, and 20 to 50. In a specific embodiment, the small-pore molecular sieve comprises SSZ-13. In a very specific embodiment, the SSZ-13 has a silica-to-alumina ratio of from 2 to 300, including 5 to 250, 5 to 200, 5 to 100, and 5 to 50; 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

Synthesis of zeolites and related micro- and mesoporous materials varies according to the structure type of the zeolitic material, but typically involves the combination of several components (e.g. silica, alumina, phosphorous, alkali, organic template etc.) to form a synthesis gel, which is then hydrothermally crystallized to form a final product. The structure directing agent (SDA) can be in the form of an organic, i.e., tetraethylammonium hydroxide (TEAOH), or inorganic cation, i.e. Na$^+$ or K$^+$. During crystallization, the tetrahedral units organize around the SDA to form the desired framework, and the SDA is often embedded within the pore structure of the zeolite crystals. In one or more embodiments, the crystallization of the molecular sieve materials can be obtained by means of the addition of structure-directing agents/templates, crystal nuclei or elements. In some instances, the crystallization can be performed at temperatures of less than 100° C. A molecular sieve having the CHA structure may be prepared according to various techniques known in the art, for example U.S. Pat. No. 8,293,198 to Beutel et al.; U.S. Pat. No. 8,715,618 of Trukhan et al.; U.S. Pat. No. 9,162,218 of Bull et al.; U.S. Pat. No. 8,883,119 of Bull et al., U.S. Pat. No. 4,544,538 to Zones et al; and U.S. Pat. No. 6,709,644 to Zones et al., which are herein incorporated by reference in their entireties.

Optionally, the obtained alkali metal zeolite is NH$_4$-exchanged to form NH$_4$-Chabazite. The NH$_4$– ion exchange can be carried out according to various techniques known in the art, for example Bleken, F.; Bjorgen, M.; Palumbo, L.; Bordiga, S.; Svelle, S.; Lillerud, K.-P.; and Olsbye, U. Topics in Catalysis 52, (2009), 218-228.

As previously mentioned, molecular sieves, e.g. zeolites, are defined as aluminosilicates with open 3-dimensional framework structures composed of corner-sharing TO$_4$ tetrahedra, where T is Al or Si. Cations that balance the charge of the anionic framework are loosely associated with the framework oxygens, and the remaining pore volume is filled with water molecules. The non-framework cations are generally exchangeable, and the water molecules removable. These voids and channels are characteristic for each zeolite. The CHA zeolites are divided into different structural types according to their topology. The zeolite framework contains open voids in the form of channels and cages which are normally occupied by water molecules and extra-skeletal cations which can be replaced. An aluminum atom attracts an excess negative charge which is compensated for by these cations. The interior of the pore system is represented by the catalytically active surface. The more aluminum and the less silicon a zeolite contains, the denser is the negative charge in its lattice and the more polar its inner surface.

Because of the presence of 2- or 3-valent cations as tetrahedron center in the zeolite skeleton the zeolite receives a negative charge in the form of so-called anion sites in whose vicinity the corresponding cation positions are located. The negative charge is compensated for by incorporating cations, e.g. metal cations, into the pores of the zeolite material. A distinction between zeolites is drawn mainly according to the geometry of the voids which are formed by the rigid network of the SiO$_4$/AlO$_4$ tetrahedra. For example, the entrances to the voids are formed from 8, 10 or 12 "rings" (narrow-, average- and wide-pored zeolites). Typically the metal content or the degree of exchange of a zeolite is determined by the metal species present in the zeolite. The zeolite can also be further treated with different metal species. There are usually three different centers in zeolites described as so-called $\alpha$-, $\beta$- and $\gamma$-positions, which define the position of the exchange spaces (also called "exchangeable positions or sites"). Overall, the quantity of each metal calculated as the corresponding metal oxide is about 1 to about 10 wt. % relative to the weight of the metal-exchanged zeolite composition. In particular it is preferred that more than 50% of the exchangeable sites (i.e. $\alpha$-, $\beta$- and $\gamma$-sites) are exchanged, preferably, more than 70% of the exchangeable sites are exchanged with the ion-exchanged metal (e.g., copper). However, free sites should remain, which are preferably Bronstedt acid centers (also called "acid centers"). This is because NO is strongly absorbed both at the exchanged metal centers and also in ion-exchange positions or at acid centers of the zeolite framework. Moreover, NH$_3$ reacts preferentially with acid centers, the presence of which is thus very important for a successful NH$_3$-SCR reaction.

In the preparation of metal ion-exchanged CHA zeolite material, clusters of metal oxide molecules can aggregate on the surface of the zeolite and/or within the zeolite framework. This aggregation occurs because the metal oxide molecules associate with the silanol groups (Si—OH groups) present on the surface of the zeolite and/or internally in defect sites. For example, in some embodiments the metal is copper. As a consequence, the catalyst compositions become either catalytically inactive or decrease in their catalytic activity and/or selectivity. Decreased NOx conversion and/or an increase in N$_2$O release are often indictors of metal oxide clusters on the surface of the zeolite and/or within the zeolite framework. Metal oxide clusters are typically formed either during the metal ion-exchange process; or during the calcination process. In some embodiments, the metal oxide clusters formed are copper oxide clusters formed during the copper ion-exchange process; and/or calcination process.

To maintain an efficient catalyst composition, the number and size of metal oxide clusters in metal ion-exchanged zeolite compositions, such as copper ion-exchanged CHA zeolite material, should be prevented and/or minimized.

According to the invention, methods comprising an ion-exchange process with a copper ion-exchanged zeolite material with at least one promoter metal compound can reduce the number of copper oxide clusters. In the present invention, although not bound by any theory of operation, the metal oxide molecules associated with the silanol groups can be displaced by the addition of a promoter metal, which can re-direct copper oxide dispersion within the zeolite framework thereby preventing metal oxide aggregation. The silanol groups, which are formed as a result of damage to the O—Al—O framework of the zeolite, are only slightly acidic in nature. Therefore, the binding affinity of the metal oxide molecules with the hydroxyl groups of the silanol groups is not very strong and can be displaced with the addition of a promoter metal such as aluminum. The displaced metal oxide molecule, e.g., copper oxide, is now able to re-locate and populate any of the remaining available exchangeable sites within the zeolite framework, thereby dissolving the clusters of copper oxide molecules. The added promoter metal, i.e., aluminum, reco-ordinates with the hydroxyl groups of the silanol, however with much stronger affinity and becomes part of the Al—Si—Al framework thereby generating additional acid sites and stabilizing isolated copper (II) cations residing in exchangeable sites.

Other methods include the pretreatment of the zeolite material with the promoter metal compound before the metal ion-exchange process to ensure the maximum formation of metal exchange sites. Yet another method introduces the ion-exchanged metal during the preparation of the zeolite material. As stated previously, copper exchange sites (i.e., metal exchange sites) strongly adsorb NO and promote NOx conversion. These copper exchange sites contain isolated $Cu^{+2}$ ions with an oxidation state of +II, which can interface with NO and foster its conversion to $N_2$. However, copper oxide clusters do not contain isolated $Cu^{+2}$ ions but rather consist of clusters of copper ions ($Cu_xO_y$), where the oxidation state of the copper ions can vary (e.g., +I and/or +II) and the physical environment for the NO molecules to interface with the copper ions is sterically more hindered. As a consequence, less NOx conversion is observed in the presence of copper oxide clusters.

However, utilizing any of the above mentioned methods provides the modified metal ion-exchanged zeolite material, i.e., copper ion-exchanged zeolite material, with an increase in acid centers within the zeolite framework, which can be measured with ammonia absorption techniques. In one embodiment, the catalyst composition of the current invention increases adsorption of ammonia in an amount of from about 0.01% to about 10.0%, preferably 0.5% to about 5% compared to catalyst compositions having the same ion-exchanged metal at the same loading but no promoter metal.

In another embodiment, the presence of acid centers within the zeolite framework can be measured using Fourier transform infrared (FTIR) spectroscopy as function of absorption intensity of silanol groups. The stretching frequency of Si—OH bonds in silanol groups on internal and external surfaces of the zeolite are measured at 3733 $cm^{-1}$ and 3747 $cm^{-1}$ respectively. A decrease in absorbance at 3733 $cm^{-1}$ indicates a decrease in silanol groups. Presumably, the hydroxyl group of the silanol moiety co-ordinates with the promoter metal aluminum generating a newly formed acid center. Hence, an increase in the number of acid centers present within the zeolite framework is observed. In some embodiments, the absorbance at 3733 $cm^{-1}$ decreases in an amount from about 10% to about 50%, preferably 20% to about 50%, more preferably 40% to about 50% (e.g., a decrease of at least 10% or at least 20% or at least 40%), compared to catalyst compositions having the same ion-exchanged metal at the same loading but no promoter metal. In some embodiments, the absorbance at 3733 $cm^{-1}$ for an aluminum modified copper ion-exchanged CHA zeolite is in the range of about 0.38 to about 0.41 (e.g., an absorbance of no more than about 0.45 or no more than about 0.42 or no more than about 0.41). In some embodiments the absorbance at 3733 $cm^{-1}$ for an unmodified copper ion exchanged CHA zeolite is about 0.5.

An increase in acid centers within the zeolite framework has been associated with a decrease in $N_2O$ emission centers, i.e., copper oxide clusters. The amount of copper oxide clusters present within the zeolite framework can be measured using nitrogen oxide (NO) diffuse reflectance infrared Fourier transform spectroscopy (DRIFT FTIR). A decrease in absorbance at 1888 $cm^{-1}$ indicates a decrease in the number of $N_2O$ emission centers, i.e. metal oxide clusters, present within the zeolite framework. In some embodiments, the absorbance at 1888 $cm^{-1}$ decreases in an amount from about 5% to about 50.0%, preferably 10% to about 80%, more preferably 15% to about 60% (e.g., a decrease of at least 5% or at least 10% or at least 15%), compared to catalyst compositions having the same ion-exchanged metal at the same loading metal but no promoter metal. In some embodiments, the absorbance at 1888 $cm^{-1}$ for an aluminum modified copper ion-exchanged CHA zeolite is in the range of about 0.025 to about 0.037 (e.g., an absorbance of no more than about 0.038 or no more than about 0.037 or no more than about 0.035). In some embodiments the absorbance at 1888 $cm^{-1}$ for an unmodified copper ion exchanged CHA zeolite is about 0.039.

Substrate

According to one or more embodiments, the substrate for the catalyst article composition (i.e., SRC composition) may be constructed of any material typically used for preparing automotive catalysts and will typically comprise a metal or ceramic honeycomb structure. The substrate typically provides a plurality of wall surfaces upon which the catalyst article (i.e., SRC catalyst) washcoat composition is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the catalyst article (i.e. SCR catalyst) composition can permeate into the pore structure of the porous walls (i.e., partially or fully occluding the pore openings) in addition to being disposed on the surface of the walls.

Figure 2:
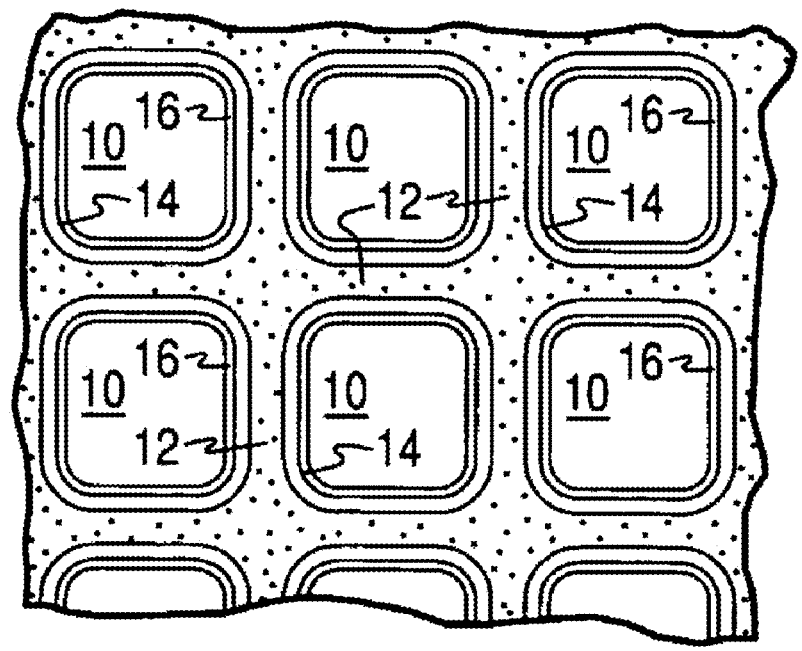
FIG. 2 is a partial cross-sectional view enlarged relative to FIG. 1 and taken along a plane parallel to the end faces of the substrate carrier of FIG. 1, which shows an enlarged view of a plurality of the gas flow passages shown in FIG. 1, in an embodiment wherein the substrate is a monolithic flow-through substrate.

FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

Figure 3:
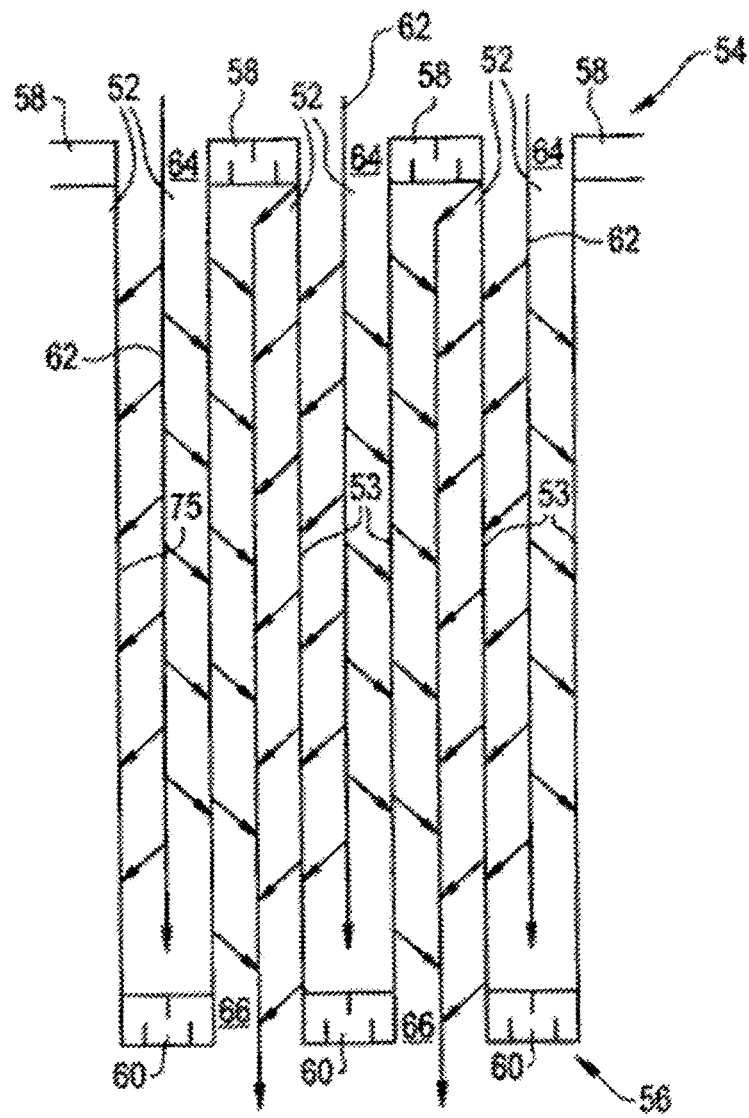
FIG. 3 is a cutaway view of a section enlarged relative to FIG. 1, wherein the honeycomb-type substrate carrier in FIG. 1 represents a wall flow filter substrate monolith.

Alternatively, FIGS. 1 and 3 illustrate an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$") are used herein to mean the weight of a component per volume of the substrate, including the volume of void spaces of the substrate. Other units of weight per volume such as g/L are also sometimes used. The total loading of the catalyst article (i.e., both impregnated metals on zeolite support material) on the catalyst substrate, such as a monolithic flow-through substrate, is typically from about 0.5 to about 6 g/in$^3$, and more typically from about 1 to about 5 g/in$^3$. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Method of Making the Catalytic Composition

Preparation of the metal ion-exchanged molecular sieve typically comprises an ion-exchanged process of the molecular sieve in particulate form with a metal precursor solution. Multiple metal precursors can be ion-exchanged at the same time or separately, can use the same external solution or separate external solutions, and are ion-exchanged on the same support particles, e.g., zeolite.

For example, in certain embodiments, metal ion-exchanged molecular sieves have previously been prepared using ion-exchange techniques described in U.S. Pat. No. 9,138,732 to Bull et al and U.S. Pat. No. 8,715,618 to Trukhan et al., which are incorporated by reference therein in their entireties. These ion-exchange processes describe the preparation of a copper ion-exchanged CHA zeolite catalyst. These particles can optionally undergo further ion-exchange with at least one metal precursor.

Treatment of the metal ion-exchanged molecular sieves with the promoter metal precursor (usually a salt for example) reduces the number and size of metal oxide clusters present in the pores of the molecular sieves and on the surface of the molecular sieves. For example, one or more promoter metal precursors can be exposed to metal ion-exchanged molecular sieves at the same time using the same external solution. In another example, the metal ion-exchanged molecular sieves can be calcined prior to contact with the promoter metal precursor(s). In another example, the metal ion-exchanged molecular sieves are only dried and not calcined prior to contact with the promoter metal precursor(s) to generate the modified metal ion-exchanged molecular sieves.

In another embodiment, the molecular sieves are treated with the promoter metal precursor prior to ion-exchange of the molecular sieve. Pre-treatment of molecular sieves with the promoter metal precursor can reduce the number and size of the metal oxide clusters formed during the subsequent metal ion-exchange process with the ion-exchanged metal to afford modified metal ion-exchanged molecular sieves.

In another embodiment, at least one promoter metal precursor, such as a metal salt, may be added to a slurry containing metal ion-exchanged molecular sieves, such as copper ion-exchanged zeolite material, which is used to washcoat a substrate as described below. In other words, the ion-exchange process along with a promoter metal precursor can be combined at the same time the washcoat solution used to coat a substrate is formed.

The support particles are usually sufficiently dry to absorb substantially all of the solution to form a moist solid. As stated above, the metal ion-exchanged molecular sieves are dried at elevated temperature and may also be optionally calcined prior to contact with the promoter metal precursor. Aqueous solutions of water soluble compounds or complexes of the metal precursors are typically utilized, such as metal salts (e.g. phosphates, nitrates or acetate salts) of the metal precursors with specific examples including zirconium (IV) hydrogenphosphate, aluminum (III) acetate dibasic, copper (II) acetate, iron (II) acetate, iron (III) acetate and a combination thereof. Colloidal solutions such as water dispersible Disperal® and Dispal® for aluminum based metal precursors may also be used. Phosphate based metal precursors may be prepared via salt ion exchange of the corresponding acetate or nitrate metal salt and a phosphate source such as phosphoric acid or a soluble phosphate. Examples of soluble phosphates include calcium phosphate (mono-, di-, and tri-basic), sodium phosphate (mono-, di-, and tri-basic), disodium diphosphate, tetrasodium diphosphate, pentapotassium triphosphate, pentasodium triphosphate, sodium polyphosphate (Graham's salt), sodium hexametaphosphate, sodium potassium polyphosphate (Tammann's salt), Kurrol's salt ($KPO_3$), sodium tripolyphosphate, disodium phosphate, magnesium phosphate (mono-, di-, and tri-basic), potassium phosphate (mono-, di-, and tri-basic), bone phosphate, ammonium phosphate (dibasic), ammonium polyphosphate, calcium polyphosphate, calcium pyrophosphate, potassium polyphosphate, and potassium pyrophosphate.

The concentration of the metal promoter precursor used to impregnate the metal ion-exchanged molecular sieves may range from about 0.1 wt. % to about 50 wt. % relative to the weight of the metal ion-exchanged molecular sieves.

Following treatment of the support particles with the solution of the metal precursors, the particles are dried, such as by heat treating the particles at elevated temperature (e.g., 100-150° C.) for a period of time (e.g., 1-3 hours), and then calcining to convert the metal components to a more catalytically active oxide form (e.g., the promoter metal and/or the ion-exchanged metal). An exemplary calcination process involves heat treatment in air at a temperature of about 500-800° C. for about 1-3 hours. The above process can be repeated as needed to reach the desired level of metal precursor impregnation. The resulting material can be stored as a dry powder or in slurry form.

Substrate Coating Process to Afford the Catalytic Article

The above-noted catalyst composition, in the form of carrier particles containing a combination of metal components impregnated therein, is mixed with water to form a slurry for purposes of coating a catalyst substrate, such as a honeycomb-type substrate.

As previously mentioned, in addition to the catalyst particles, which contain metal ion-exchanged molecular sieves, the slurry may optionally contain at least one promoter metal precursor. The metal precursors used are phosphates, nitrates, or acetate salts, with specific examples including zirconium (IV) hydrogenphosphate, aluminum (III) acetate dibasic, aluminum (IV) phosphate, aluminum (III) nitrate, zirconium (IV) nitrate, zirconium (IV) tetraacetate, iron (III) nitrate, iron (III) phosphate, copper (II) acetate, iron (II) acetate, and iron (III) acetate.

In addition to the catalyst particles, the slurry may optionally contain alumina as a binder, water-soluble or water-dispersible stabilizers (e.g., barium acetate), promoters (e.g., lanthanum nitrate), associative thickeners, and/or surfactants (including anionic, cationic, non-ionic or amphoteric surfactants). It is advantageous to avoid the addition of acids to the slurry in order to avoid the formation of dissociated metal components or related metal species that could lead to alloying within the catalyst material. Accordingly, in certain embodiments, the slurry used to coat the catalyst substrate can be substantially or completely acid-free.

When present, the alumina binder is typically used in an amount of about 0.05 $g/in^3$ to about 1 $g/in^3$. The alumina binder can be, for example, boehmite, gamma-alumina, or delta/theta alumina.

The slurry can be milled to enhance mixing of the particles and formation of a homogenous material. The milling can be accomplished in a ball mill, continuous mill, or other similar equipment, and the solids content of the slurry may be, e.g., about 20-60 wt. %, more particularly about 30-40 wt. %. In one embodiment, the post-milling slurry is characterized by a D90 particle size of about 20 to about 30 microns. The D90 is defined as the particle size at which 90% of the particles have a finer particle size.

The slurry is then coated on the catalyst substrate using a washcoat technique known in the art. In one embodiment, the catalyst substrate is dipped one or more times in the slurry or otherwise coated with the slurry. Thereafter, the coated substrate is dried at an elevated temperature (e.g., about 100-150° C.) for a period of time (e.g., about 1-3 hours) and then calcined by heating, e.g., at about 400-600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate as will be apparent to those of skill in the art, the catalyst loading can be modified by altering the slurry rheology. In addition, the coating/drying/calcining process can be repeated as needed to build the coating to the desired loading level or thickness.

The catalyst composition can be applied as a single layer or in multiple layers to generate the catalyst article. In one embodiment, the catalyst is applied in a single layer to generate the catalyst article (e.g., only layer 14 of FIG. 2). In another embodiment, the catalyst composition is applied in multiple layers to afford the catalyst article (e.g., layers 14 and 16 of FIG. 2).

In some embodiments, the catalyst article is used in methods for the SCR process described above for the reduction of NOx in the exhaust gas, which optionally can also reduce dinitrogen oxide ($N_2O$) emissions for a time and temperature sufficient to minimize the direct oxidation of ammonia to generate $N_2O$. In certain embodiments, the temperature range is from about 200° C. to about 600° C. In some embodiments, the catalyst article may be fresh or hydrothermally aged. In some embodiments, the $N_2O$ make decreases in an amount of about 10% to about 75%, preferably about 20% to about 60%, more preferably about 30% to about 50% (e.g., a decrease of at least 10% or at least 20% or at least 30%), compared to a fresh catalyst article having the same ion-exchanged metal at the same loading but no promoter metal. For example, in some embodiments, at a temperature of about 250° C. the $N_2O$ make of a fresh catalyst article of the invention decreases in an amount of about 50% compared to a fresh catalyst article having the same promoter metal at the same loading as the fresh catalyst article of the invention but no promoter metal. In another embodiment, at a temperature of about 550° C. the $N_2O$ make of a fresh catalyst article of the invention decreases in an amount of about 35% compared to a fresh catalyst article having the same ion-exchanged metal at the same loading as the fresh catalyst article of the invention but no promoter metal. Likewise, in some embodiments, at a temperature of about 250° C. the $N_2O$ make of an aged catalyst article of the invention decreases in an amount of about 26% compared to an aged catalyst article having the same ion-exchanged metal at the same loading as the aged catalyst article of the invention but no promoter metal. In another embodiment, at a temperature of about 500° C. the $N_2O$ make of an aged catalyst article of the invention decreases in an amount of about 28% compared to an aged catalyst article having the same ion-exchanged metal at the same loading as the aged catalyst article of the invention but no promoter metal.

Emission Treatment System

The present invention also provides an emission treatment system that incorporates the SRC composition (i.e., catalyst article) described herein. The SRC composition of the present invention is typically used in an integrated emissions treatment system comprising one or more additional components for the treatment of exhaust gas emissions, e.g., exhaust gas emissions from a diesel engine. For example, the emission treatment system may further comprise a catalyzed soot filter (CSF) component and/or a selective diesel oxidation (DOC) catalyst article. The SRC of the invention is typically located upstream or downstream from the soot filter and downstream from the diesel oxidation catalyst component, although the relative placement of the various components of the emission treatment system can be varied. The treatment system includes further components, such as reductant injectors for ammonia precursors, and may optionally include any additional particulate filtration components, $NO_x$ storage and/or trapping components. The preceding list of components is merely illustrative and should not be taken as limiting the scope of the invention.

The CSF may comprise a substrate coated with a washcoat layer containing one or more catalysts for burning trapped soot and or oxidizing exhaust gas stream emissions. In general, the soot burning catalyst can be any known catalyst for combustion of soot. For example, the CSF can be catalyzed with one or more high surface area refractory oxides (e.g., an alumina or a zirconia oxide) and/or an oxidation catalyst (e.g., a ceria-zirconia) for the combustion of unburned hydrocarbons and to some degree particulate matter. The soot burning catalyst can be an oxidation catalyst comprising one or more precious metal catalysts (e.g., platinum, palladium, and/or rhodium). In some embodiments, the CSF may comprise a substrate coated with a washcoat layer containing one or more catalysts for reducing NOx in the exhaust gas stream emissions. For example, the CSF can be catalyzed with one or more selective reduction catalysts for the conversion of NOx in the exhaust gas stream in addition to containing one or more layers containing one or more catalysts for burning trapped soot and or oxidizing exhaust gas stream emissions.

Figure 4:
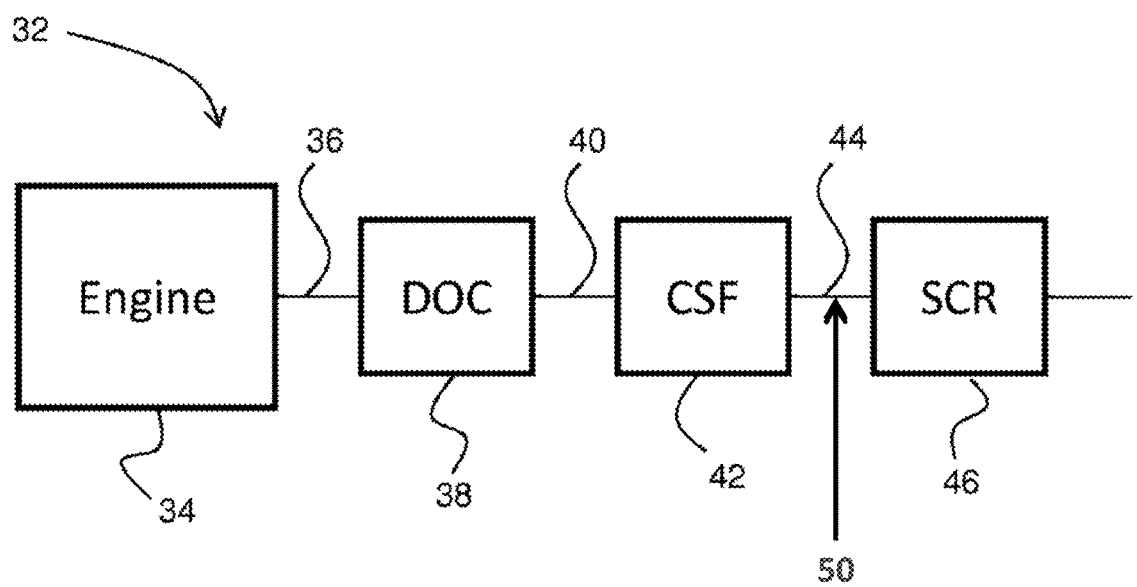
FIG. 4 shows a schematic depiction of an embodiment of an emission treatment system in which an SRC catalyst of the present invention is utilized.

One exemplary emissions treatment system is illustrated in FIG. 4, which depicts a schematic representation of an emission treatment system 32. As shown, an exhaust gas stream containing gaseous pollutants and particulate matter is conveyed via exhaust pipe 36 from an engine 34 to a diesel oxidation catalyst (DOC) 38 to a catalyzed soot filter (CSF) to a selective reductive catalyst (SRC), which is coated with the washcoat composition of the present invention. In the DOC 38, unburned gaseous and non-volatile hydrocarbons (i.e., the SOF) and carbon monoxide are largely combusted to form carbon dioxide and water. In addition, a proportion of the NO of the $NO_x$ component may be oxidized to $NO_2$ in the DOC.

The exhaust stream is next conveyed via exhaust pipe 40 to a catalyzed soot filter (CSF) 42, which traps particulate matter present within the exhaust gas stream. The CSF 42 is optionally catalyzed for passive or active soot regeneration. The CSF 42 can optionally include a SRC composition for the conversion of NOx present in the exhaust gas.

After removal of particulate matter, via CSF 42, the exhaust gas stream is conveyed via exhaust pipe 44 to a downstream selective catalytic reduction (SCR) component 46 of the invention for the further treatment and/or conversion of $NO_x$. The exhaust gas passes through the SCR component 46 at a flow rate which allows sufficient time for the catalyst composition to reduce the level of NOx in the exhaust gas at a given temperature. The SCR component 46 may optionally be included in the emission treatment system provided that CSF 42 already includes an SRC composition. An injector 50 for introducing a nitrogenous reducing agent into the exhaust stream is located upstream of the SRC 46. The introduced nitrogenous reducing agent into the gas exhaust stream promotes the reduction of the NOx to $N_2$ and water as the gas is exposed to the catalyst composition. For emission treatment system where CSF 42 already includes an SRC composition 46, the injector 50 for introducing the nitrogenous reducing agent into the exhaust stream is located upstream of the CSF 42. Alternatively, for emission systems, which include CSF 42 with an SRC and an SRC 46, one and/or two injectors 50 may be included upstream of CSF 42 and/or SRC 46. The introduced nitrogenous reducing agent into the gas exhaust stream promotes the reduction of the NOx to $N_2$ and water as the gas is exposed to the catalyst composition.

Furthermore, this nitrogenous reducing agent may be introduced into the exhaust gas prior to contacting the SRC catalyst for the treatment of NOx. In general, this reducing agent for SCR processes broadly means any compound that promotes the reduction of NOx in an exhaust gas. Examples of such reductants include ammonia, hydrazine or any suitable ammonia precursor such as urea ($(NH_2)_2CO$), ammonium carbonate, ammonium carbamate, ammonium hydrogen carbonate or ammonium formate.

With respect to this SCR process, provided herein is a method for the reduction of $NO_x$ in an exhaust gas, which comprises contacting the exhaust gas with the catalyst composition described herein and optionally in the presence of a reductant for a time and temperature sufficient to catalytically reduce $NO_x$ thereby lowering the concentration of $NO_x$ in the exhaust gas. In certain embodiments, the temperature range is from about 200° C. to about 600° C. For example, at a temperature of 200° C. the catalyst composition of the invention reduces the level of NOx in the exhaust gas by at least about 50%. Likewise, at a temperature of 600° C. the catalyst composition of the invention reduces the level of NOx in the exhaust gas by at least about 70%. The catalyst composition of the invention may be fresh or hydrothermally aged. The amount of NOx reduction is dependent upon the contact time of the exhaust gas stream with the catalyst, and thus is dependent upon the space velocity. The contact time and space velocity is not particularly limited in the present invention. However, the present catalyst composition of the invention has shown increased NOx reduction compared to commercial reference SCR catalysts. As such, the catalyst composition can perform, well even at high space velocity, which is desirable in certain applications.

With respect to this SCR process, the methods described above for the reduction of NOx in the exhaust gas also optionally reduce dinitrogen oxide ($N_2O$) emissions for a time and temperature sufficient to minimize the direct oxidation of ammonia ($NH_3$) to generate $N_2O$. In certain embodiments, the temperature range is from about 200° C. to about 600° C. For example, at a temperature of 200° C. the catalyst composition of the invention releases an amount of $N_2O$ emissions of about less than about 10 ppm. Likewise, in certain embodiments, at a temperature of 600° C. the catalyst composition of the invention releases an amount of $N_2O$ emissions of about less than about 15 ppm. The catalyst composition of the invention may be fresh or hydrothermally aged. The amount of $N_2O$ generation is dependent upon the contact time of the exhaust gas stream with the catalyst, and the amount of ammonia and oxygen present during the contact time period.

EXAMPLES

Aspects of the present invention are more fully illustrated by the following examples, which are set forth to illustrate certain aspects of the present invention and are not to be construed as limiting thereof.

The following examples are directed towards modified copper ion-exchanged CHA zeolite catalyst compositions intended for use in diesel NOx abatement applications—the examples provide a method of preparation and illustrate improved high temperature SCR performance obtained on coated cores with nominal loading (dry gain) of 2.1 g/in³.

Example 1: Synthesis of Zr Modified Copper Ion-Exchanged CHA Zeolite Catalyst Composition Oxalic acid (20 g) was mixed with water (100 g). Zirconium acetate (50 g) was added while stirring. Upon completion of addition the reaction mixture was stirred at 80° C. for 4 h. Phosphoric acid (10 g) was added to the reaction mixture, which continued stirring for an additional 72 hours at 105° C. The reaction mixture was then centrifuged to obtain a crude solid material, which was calcined at 450° C. for 3 h to obtain α-zirconium phosphate (α-Zr phosphate) as a dry powder.

Dry α-Zr phosphate powder (0.04 g) was mixed with water (10 g) followed by the addition of copper ion-exchanged CHA zeolite material (2.0 g) while stirring. Upon completion of addition the reaction mixture continued stirring at 65° C. for 18 h. The crude reaction mixture was filtered, washed, and dried to obtain a crude solid product. The crude product was calcined at 550° C. for 3 h to obtain an activated Zr modified copper ion-exchanged CHA zeolite catalyst composition as a dry powder.

Example 2: Synthesis of Zr Modified Copper Ion-Exchanged CHA Zeolite Catalyst Composition Oxalic acid (20 g) was mixed with water (100 g). Zirconium acetate (50 g) was added while stirring. Upon completion of addition the reaction mixture was stirred at 80° C. for 4 h. Phosphoric acid (10 g) was added to the reaction mixture, which continued stirring for an additional 72 hours at 105° C. The reaction mixture was then centrifuged to obtain a crude solid material, which was calcined at 450° C. for 3 h to obtain α-zirconium phosphate (α-Zr phosphate) as a dry powder.

Dry α-Zr phosphate powder (0.1 g) was mixed with water (10 g) followed by the addition of copper ion-exchanged CHA zeolite material (2.0 g) while stirring. Upon completion of addition the reaction mixture continued stirring at 65° C. for 18 h. The crude reaction mixture was filtered, washed, and dried to obtain a crude solid product. The crude product was calcined at 550° C. for 3 h to obtain an activated Zr modified copper ion-exchanged CHA zeolite catalyst composition as a dry powder.

Example 3: Synthesis of Zr and Al Modified Copper Ion-Exchanged CHA Zeolite Catalyst Composition Aluminum acetate dibasic (6.0 g) was dissolved in water (200 g) prior to the addition of α-Zr phosphate powder (5 g). The reaction mixture was stirred at 60° C. for 2 h followed by the addition of copper ion-exchanged CHA zeolite material (100.0 g) while stirring. Upon completion of addition the reaction mixture continued stirring at 70° C. for 18 h. The crude reaction mixture was filtered, washed, and dried at 200° C. for 6 h to obtain a crude solid product. The crude product was calcined at 550° C. for 3 h to obtain an activated Zr/Al modified copper ion-exchanged CHA zeolite catalyst composition.

Example 4: Synthesis of Zr, Al, and Cu Modified Copper Ion-Exchanged CHA Zeolite Catalyst Composition Copper acetate (0.025 g) and aluminum acetate dibasic (0.118 g) were dissolved in water (10 g) prior to the addition of α-Zr phosphate powder (0.15 g). The reaction mixture was stirred at 70° C. for 2 h followed by the addition of copper ion-exchanged CHA zeolite material (2.0 g) while stirring. Upon completion of addition the reaction mixture continued stirring at 70° C. for 18 h. The crude reaction mixture was filtered, washed, and dried at 200° C. for 6 h to obtain a crude solid product. The crude product was calcined at 550° C. for 3 h to obtain an activated Zr/Al/Cu modified copper ion-exchanged CHA zeolite catalyst composition.

Example 5: General Procedure for the Preparation of Metal Modified Copper Ion-Exchanged CHA Zeolite Catalyst Composition A solution of phosphoric acid is mixed with a solution of a metal salt such the nitrate or acetate salts of Al, Fe, or Zr nitrate and/or combinations thereof. The reaction mixture is stirred at room temperature or elevated temperature, e.g. up to 100° C. When the metal salt precipitates out of solution the suspension is spray dried to form a solid powder.

The solid powder is mixed with water followed by the addition of copper ion-exchanged CHA zeolite material while stirring. Upon completion of addition, the reaction mixture is stirred at 65° C. for 18 h. The crude reaction mixture is filtered, washed, and dried to obtain a crude solid product. The crude product is calcined at 550° C. for 3 h to obtain an activated metal modified copper ion-exchanged CHA zeolite catalyst composition as a dry powder.

The amounts of all reagents are dependent on the composition of the washcoat slurry being generated, which requires about 35 to about 45% solid content.

Example 6: Synthesis of Al Modified CHA Zeolite Catalyst Composition

Aluminum acetate dibasic (9 g) was mixed with water (400 g) followed by the addition of copper ion-exchanged CHA zeolite material (150.0 g of dried filter cake) while stirring. Upon completion of addition the reaction mixture continued stirring at 65° C. for 4 h. The crude reaction mixture was then spray dried to obtain a crude solid product. The crude product was calcined at 550° C. for 3 h to obtain an activated Al modified CHA zeolite catalyst composition as a dry powder.

Example 7: Evaluation of Al Modified Copper Ion-Exchanged CHA Zeolite Catalyst Composition for Ammonium Adsorption Capacity A temperature programmed desorption study (TPD) was carried out to evaluate desorption of ammonia molecules on the surface of modified CHA zeolite catalyst compositions. Two Al modified CHA zeolite catalyst compositions were evaluated, with a 5% and 10% loading on the basis of $Al_2O_3$ respectively. These Al modified CHA zeolite catalyst compositions were prepared in a similar fashion as described in Example 7. Reference material $NH4^+$-CHA zeolite with alumina was prepared by mechanical mixing of $NH4^+$-CHA zeolite with alumina followed by calcination at 550° C. for 3 h.

Figure 5A:
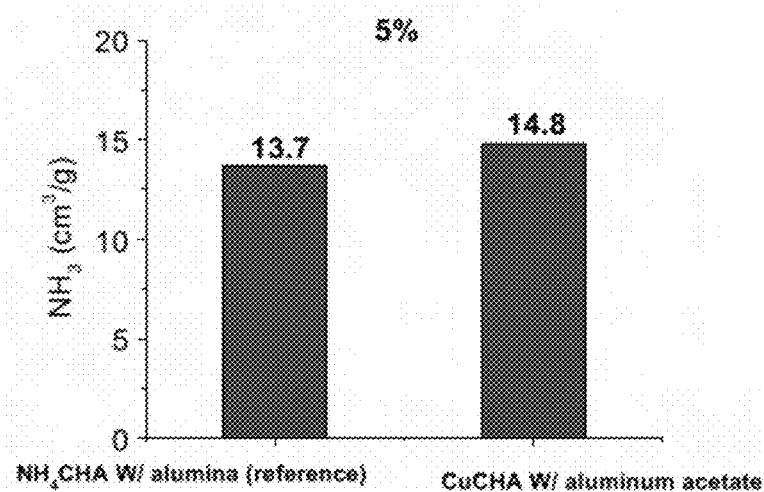
FIGS. 5a and 5b are panels showing a comparison of $NH_3$-TPD profiles of aluminum modified copper ion exchanged CHA zeolite catalyst compositions at various loadings with a $NH_4^+$-CHA zeolite with alumina reference material.
Figure 5B:
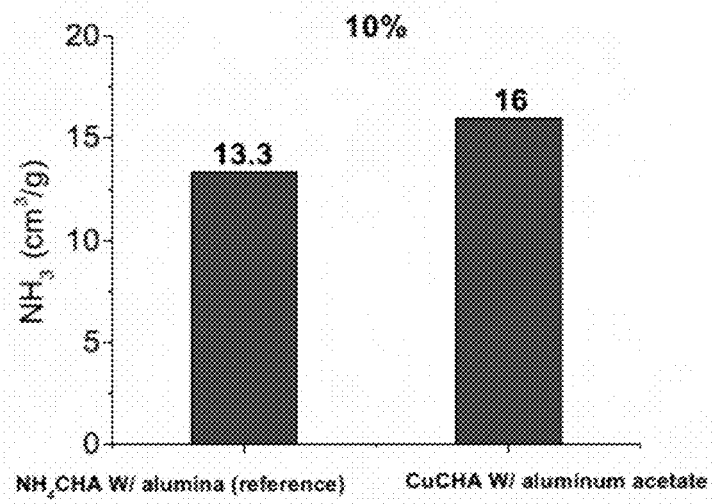

Typically, treatment of zeolite material with soluble ammonium salts have demonstrated an increase in the number of acid centers present in the zeolite framework and thereby decreased the number of copper oxide clusters, which are responsible for the generation of $N_2O$ make. The increase in the number of acid centers present in the zeolite framework can be measured by the adsorption of ammonia molecules measured in units of $cm^3/g$. Results presented in FIG. 5a show an increase of ammonia adsorption of about 1.1 $cm^3/g$ for the Al modified copper ion-exchanged CHA zeolite catalyst composition with a 5% loading on the basis of $Al_2O_3$ compared to reference compound $NH4^+$-CHA zeolite with alumina. FIG. 5b shows an increase of ammonia adsorption of about 2.7 $cm^3/g$ for the Al modified copper ion-exchanged CHA zeolite catalyst composition with a 10% loading on the basis of $Al_2O_3$ compared to reference compound $NH4^+$-CHA zeolite with alumina. The increase in ammonia adsorption confirms an increase in acid center for the corresponding Al modified copper ion-exchanged CHA zeolite catalyst compositions compared to the reference composition.

Example 8: Characterization of Al Modified Copper Ion-Exchanged CHA Zeolite Catalyst Composition FTIR spectra were taken from various modified copper ion-exchanged CHA zeolite catalyst compositions including a copper ion-exchanged CHA zeolite modified with soluble aluminum salt (AlOAC—CuCHA), a copper ion-exchanged CHA zeolite modified with insoluble alumina ($Al_2O_3$—CuCHA), and a reference compound such as a copper ion-exchanged CHA zeolite without any further modification (CuCHA). These Al modified CHA zeolite catalyst compositions were prepared in a similar fashion as described in Example 7 and were all aged at 750° C. under steam-air for 5 h.

Figure 6:
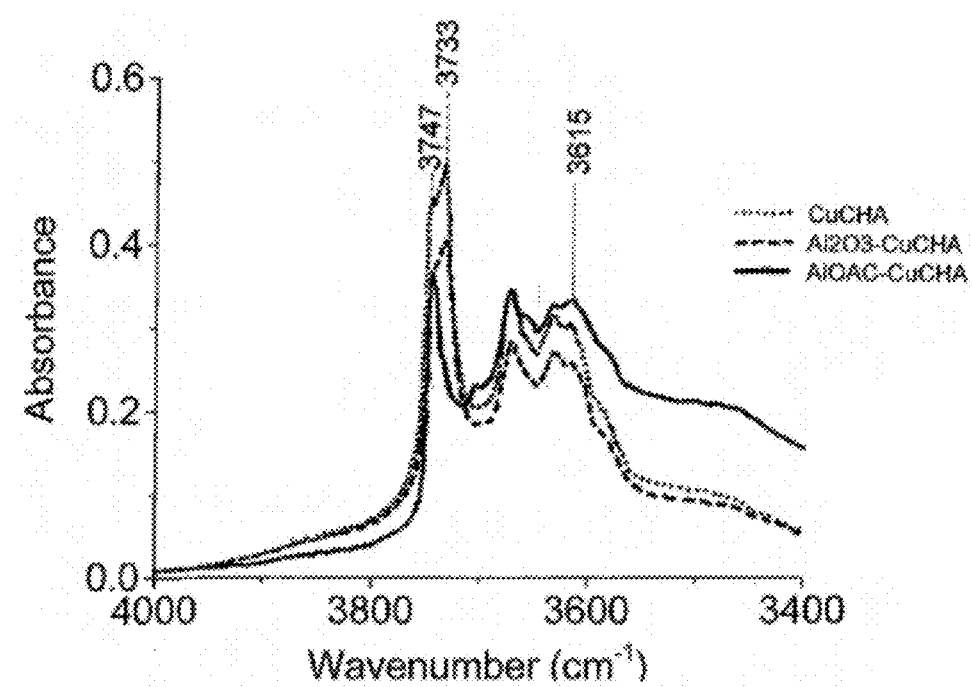
FIG. 6 is a graph showing FTIR spectra of a copper ion-exchanged CHA zeolite modified with insoluble alumina ($Al_2O_3$—CuCHA), a copper ion-exchanged CHA zeolite modified with soluble alumina (AlOAc—CuCHA), and a copper ion-exchanged CHA zeolite without any further modification (CuCHA)

The results are shown in FIG. 6. Shown by the case of copper ion-exchanged CHA zeolite, the modification by using soluble aluminum salt (aluminum acetate dibasic, designated as AlOAC) resulted in unique structural changes, which were measured in the FTIR. The FTIR spectra of AlOAC—CuCHA exhibits a different absorbance profile in the region of 4000 to 3400 $cm^{-1}$ compared to its aluminum insoluble counterpart $Al_2O_3$—CuCHA and aluminum free reference compound CuCHA.

In the spectra reference compound CuCHA exhibits two absorbance stretches indicative of silanol groups, at 3747 $cm^{-1}$ and 3733 $cm^{-1}$, respectively. The silanol groups associated with the 3747 $cm^{-1}$ peak are those isolated on zeolite external surface. The 3733 $cm^{-1}$ peak is due to the isolated silanol groups on the internal zeolite surface sites which are associated with tricoordination aluminum. Modification with soluble aluminum salt (aluminum acetate dibasic) leads to removal of the isolated silanol groups on zeolite internal surface, as indicated by depletion of the 3733 $cm^{-1}$ band from the spectrum for AlOAC—CuCHA. Such interaction between silica and aluminum has been known to create acid sites that function to stabilize isolated Cu (II) cations. This structural feature is not observed for CuCHA, the aluminum free reference compound, and the aluminum insoluble counterpart $Al_2O_3$—CuCHA. The FT-IR spectra (in diffuse reflectance mode) were collected on a Bio-Rad Excalibur FT-IR spectrometer with a Spectra-Tec high temperature and high pressure chamber. The sample was ground in agate morta to fine powder and put into the sample cup in the chamber. The sample was dehydrated at 400° C. for 1 h with argon purging (40 ml/min). After the dehydration, the sample was cooled down to 30° C. A FT-IR spectrum was collected. The FT-IR spectrum was ratioed with a background spectrum of KBr.

Example 9: Evaluation of Al Modified Copper Ion-Exchanged CHA Zeolite Catalyst Composition for the Presence of Copper Centers In-situ NO/DRIFT spectra were taken from various modified copper ion-exchanged CHA zeolite catalyst compositions including a copper ion-exchanged CHA zeolite modified with soluble aluminum salt (AlOAC—CuCHA, 2% loading based on $Al_2O_3$), a copper ion-exchanged CHA zeolite modified with insoluble alumina ($Al_2O_3$—CuCHA), and a reference compound such as a copper ion-exchanged CHA zeolite without any further modification (CuCHA). These Al modified CHA zeolite catalyst compositions were prepared in a similar fashion as described in Example 7 and were all aged at 550° C. for 3 h.

NO/DRIFTS technique, employing NO as a probe molecule, was used to diagnose the copper oxide clusters on the modified CuCHA materials. In FIG. 7, the FTIR features in the displayed range are due to NO molecules chemisorbed on different types of copper species of the CuCHA materials. For example, the absorbance at 1888 $cm^{-1}$ is associated with copper oxide clusters, which contribute to $N_2O$ emission during SCR reaction. The modified samples showed lower intensities of the 1888 cm$^{-1}$ feature compared to the reference material CuCHA, implying a reduction in $N_2O$ emission centers compared to the aluminum free reference material. AlOAC—CuCHA exhibited the lowest absorbance profile at 1888 cm$^{-1}$. The FT-IR spectra (in diffuse reflectance mode) were collected on a Bio-Rad Excalibur FT-IR spectrometer with a Spectra-Tec high temperature and high pressure chamber. The sample was ground in agate morta to fine powder and put into the sample cup in the chamber. The sample was dehydrated at 400° C. for 1 h with argon purging (40 ml/min). After the dehydration, the sample was cooled down to 30° C. A FT-IR spectrum was collected and used as a background spectrum. NO (1% NO in argon) adsorption was performed at 30° C. and FT-IR spectra were collected until equilibrium was reached. The NO adsorption spectra were obtained by taking the ratio with the background spectrum.

Example 11: Evaluation of Modified Copper Ion-Exchanged CHA Zeolite Catalyst Composition as an SCR Catalyst for Decreasing Diesel NOx Co-exchanged samples of the zeolite material were coated on the cores using standard procedure and tested for the SCR performance. For example, for AlOAC—CuCHA, prepared according to Example 6, a washcoat loading of 2.1 g/in$^3$ was obtained. The obtained CuCHA catalyst comprised CuO at a range of about 3 to 3.5% by weight. A CuCHA slurry was prepared to 40% target solids. The slurry was milled and a binder of zirconium acetate in dilute acetic acid (containing 30% $ZrO_2$) was added into the slurry with agitation. The slurry was coated onto 1"D×3"L cellular ceramic cores, having a cell density of 400 cpsi (cells per square inch) and a wall thickness of 4-6 mil. The coated cores were dried at 130° C. for 5 minutes and calcined at about 450° C. for 1 hour. Depending on the particle, the material may be milled to appropriate diameter at D90 for successful washcoating.

Nitrogen oxides selective catalytic reduction (SCR) efficiency of a fresh catalyst core was measured by adding a feed gas mixture of 500 ppm of NO, 500 ppm of $NH_3$, 10% $O_2$ by volume, 5% $H_2O$ by volume, balance $N_2$ to a steady state reactor containing the above core.

For the catalytic test, the washcoated core was shaped into a square cross section wrapped with a ceramic insulation mat and placed inside an Inconel reactor tube heated by an electrical furnace. The gases, $O_2$ (from air), $N_2$ and $H_2O$ were preheated in a preheater furnace before entering the reactor. The reactive gases NO and $NH_3$ were introduced between the preheater furnace and the reactor.

The reaction was carried at a space velocity of 80,000 h$^{-1}$ across a 200° C. to 600° C. temperature range. Space velocity is defined as the gas flow rate comprising the entire reaction mixture divided by the geometric volume of the catalyst core. These conditions define the standard test for fresh catalysts.

Hydrothermal stability of the catalyst was measured by hydrothermal aging of the catalyst core at 750° C. for 5 hours in the presence of steam/air, followed by measurement of nitrogen oxides SCR efficiency by the same process as outlines above for the SCR evaluation on a fresh catalyst core.

Results are summarized in FIGS. 8 and 9. For the inventive examples, minimal changes of NOx conversion at 200° C. were observed, when comparing NOx conversion activity for fresh AlOAC—CuCHA catalyst compositions and fresh aluminum free reference material CuCHA (FIG. 8a; both catalyst exhibited NOx conversion activity of about 60%). Changes in NOx conversion activity were more dramatic at 600° C., where fresh AlOAC—CuCHA catalyst compositions demonstrated at least a 5% increase in NOx conversion activity compared to the fresh aluminum free reference material CuCHA. NOx conversion over 70% was observed at 600° C. for AlOAC—CuCHA. A more significant change in NOx conversion was observed when comparing aged AlOAC—CuCHA catalyst compositions compared to aged aluminum free reference material CuCHA. Here, the aged AlOAC—CuCHA catalyst compositions exhibited at least 10% more NOx conversion compared to the aged aluminum free reference material CuCHA at 600° C. NOx conversion over 70% was observed at 600° C. for AlOAC—CuCHA. At 200° C. there was no significant difference in NOx conversion for both catalyst compositions (FIG. 8b).

Figure 9A:
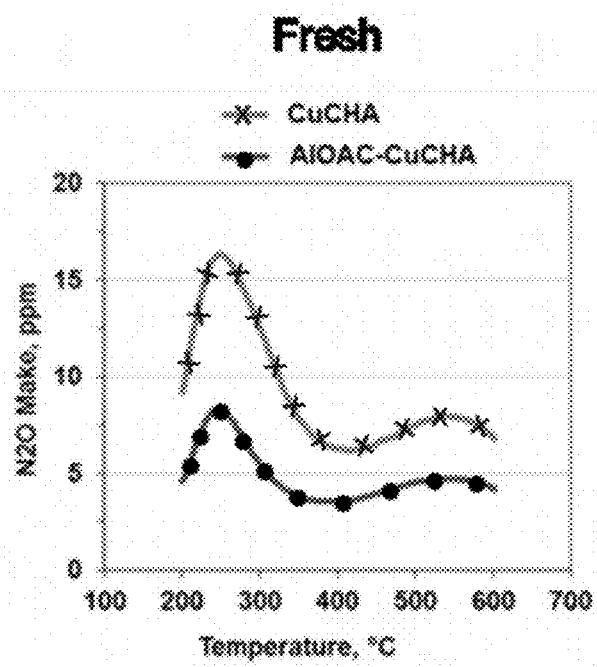
Figure 9B:
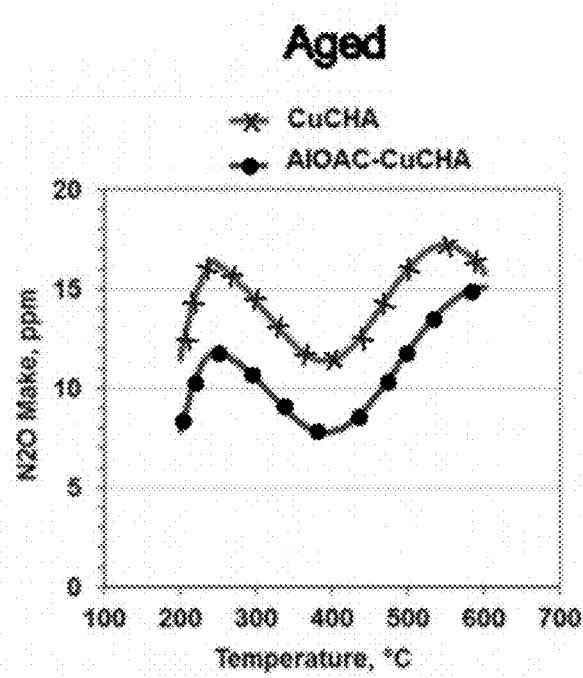

FIGS. 9a and 9b show the results of the $N_2O$ emission in the SCR testing for fresh (9a) and aged (9b) catalyst compositions. Fresh and aged AlOAC—CuCHA catalyst compositions exhibited lower $N_2O$ emission during the 200-600° C. temperature testing range compared to the fresh and aged CuCHA reference material. At 200° C., the $N_2O$ emission is reduced by about 50% when the fresh AlOAC—CuCHA catalyst composition was examined. A less dramatic change is observed at 600° C. However, at 200° C. as well as at 600° C. $N_2O$ make for the fresh AlOAC—CuCHA catalyst composition does not exceed 5 ppm. For aged catalysts, the AlOAC—CuCHA catalyst composition produces significantly less $N_2O$ at 200° C. than at 600° C. compared to reference material CuCHA. When comparing fresh and aged AlOAC—CuCHA catalyst compositions with each other, the fresh AlOAC—CuCHA catalyst composition produces significantly less $N_2O$ than the corresponding aged catalyst composition within the 200° C. to 600° C. tested temperature range.

What is claimed:

1. A catalyst composition comprising:
a metal ion-exchanged 8-ring, small pore zeolite, comprising an ion-exchanged metal within at least a portion of the exchange sites of the zeolite, wherein the ion-exchanged metal is a rare-earth metal, a transition metal, or a combination thereof, and further comprising a promoter metal wherein at least a portion of the promoter metal is associated with silanol groups located on a surface of the zeolite and in defect sites of the zeolite, wherein the promoter metal is zirconium, aluminum, or a combination thereof.

2. The catalyst composition of claim 1, wherein the ion-exchanged metal is selected from the group consisting of Cu, Co, Ni, La, Mn, Fe, V, Ag, Ce, Nd, Pr, Ti, Cr, Zn, Nb, Mo, Hf, Y, and W.

3. The catalyst composition of claim 1, wherein the zeolite has a structure type selected from AEI, AFT, AFX, CHA, EAB, ERI, KFI, LEV, LTN, MSO, SAS, SAT, SAV, SFW, and TSC.

4. The catalyst composition of claim 1, wherein the zeolite has a CHA structure type and is an aluminosilicate zeolite having a silica-to alumina ratio (SAR) of about 5 to about 100.

5. The catalyst composition of claim 1, wherein the ion-exchanged metal is present in said catalyst composition in an amount of from about 0.01% to about 15.0% by weight, based on the total weight of the metal ion-exchanged zeolite, calculated as metal oxide.

6. The catalyst composition of claim 1, wherein the ion-exchanged metal is copper and is present in said catalyst composition in an amount of from about 0.01% to about 4.0% by weight, based on the total weight of the metal ion-exchanged zeolite, calculated as copper oxide (CuO).

7. The catalyst composition of claim 1, wherein the promoter metal is present in said catalyst composition in an amount of from about 0.01% to about 15.0% by weight, based on the total weight of the metal ion-exchanged zeolite, calculated as metal oxide.

8. The catalyst composition of claim 1, wherein the promoter metal is aluminum and is present in said catalyst composition in an amount of from about 2.0% to about 10.0% by weight, based on the total weight of the metal ion-exchanged zeolite, calculated as aluminum oxide ($Al_2O_3$).

9. The catalyst composition of claim 1, wherein the metal ion-exchanged zeolite exhibits a decrease in absorbance at 3733 $cm^{-1}$ using FTIR spectroscopy in an amount from about 10% to about 50% compared to the same metal ion-exchanged zeolite having no promoter metal present.

10. The catalyst composition of claim 8, wherein the metal ion-exchanged molecular sieve comprises copper as the ion-exchanged metal.

11. The catalyst composition of claim 10, wherein the metal ion-exchanged zeolite exhibits a decrease in the absorbance at 1888 $cm^{-1}$ using NO/DRIFT FTIR spectroscopy in an amount from about 5% to about 50% compared to a catalyst composition having the same copper ion-exchanged zeolite at the same loading but having no promoter metal present.

12. A method for reducing the number or size of metal oxide clusters present in a 8-ring, small pore zeolite framework of a modified metal ion-exchanged 8-ring, small pore zeolite catalyst comprising:
    providing a metal ion-exchanged 8-ring, small pore zeolite composition, wherein said composition includes ion-exchanged metal within at least a portion of the exchange sites of the zeolite, wherein the ion-exchanged metal is a rare-earth metal, a transition metal, or a combination thereof;
    treating said metal ion-exchanged zeolite with at least one promoter metal precursor, wherein the promoter metal precursor contains a metal selected from aluminum, zirconium, and a combination thereof, to generate a modified metal ion-exchanged zeolite composition, such that at least a portion of the metal from the metal precursor is associated with silanol groups located on a surface of the zeolite and in defect sites of the zeolite; and
    calcining the modified metal ion-exchanged zeolite composition to afford an activated modified metal ion-exchanged zeolite catalyst.

13. The method of claim 12, wherein said treating step comprises combining the metal ion-exchanged zeolite with the at least one promoter metal precursor in a washcoat suspension adapted for coating a catalyst substrate having a plurality of channels adapted for gas flow.

14. The method of claim 13, further comprising applying the washcoat suspension to a catalyst substrate, and wherein said calcining step comprises calcining the catalyst substrate.

15. A catalyst article comprising a catalyst substrate having a plurality of channels adapted for gas flow, each channel having a washcoat dispersed therein, the washcoat comprising the catalyst composition of claim 1.

16. The catalyst article of claim 15, wherein the catalyst substrate is a honeycomb, wherein the honeycomb substrate is a wall flow filter substrate or a flow through substrate.

17. The catalyst article of claim 15, wherein said catalyst is applied to the substrate with a loading of at least about 1.0 $g/in^3$.

18. A method for reducing NOx level in an exhaust gas, the method comprising contacting the gas with the catalyst composition of claim 1 for a time and temperature sufficient to reduce the level of NOx in the gas.

19. The method of claim 18, wherein said NOx level in the exhaust gas is reduced to $N_2$ at a temperature between 200° C. to about 600° C. and wherein one or more of: (a) said NOx level in the exhaust gas is reduced by at least 50% at 200° C.; and (b) wherein said NOx level in the exhaust gas is reduced by at least 70% at 600° C.

20. A method for reducing NOx level in an exhaust gas comprising contacting the gas with a catalyst article according to claim 15 for a time and temperature sufficient to reduce the level of NOx in the gas and wherein $N_2O$ make is decreased in an amount of about 10% to about 75% compared to a catalyst article comprising the same ion-exchanged metal at the same loading as said catalyst article but no promoter metal.

21. An emission treatment system for treatment of an exhaust gas stream, the emission treatment system comprising:
    a.) an engine producing an exhaust gas stream;
    b.) the catalyst article of claim 15 positioned downstream from the engine in fluid communication with the exhaust gas stream and adapted for the reduction of NOx within the exhaust stream to form a treated exhaust gas stream; and
    c.) an injector adapted for the addition of a reductant to the exhaust gas stream to promote reduction of NOx to $N_2$ and water as the exhaust gas stream is exposed to the catalyst article, wherein the reductant comprises ammonia or an ammonia precursor.

22. The emission treatment system of claim 21, wherein the engine is a diesel engine.

23. The emission treatment system of claim 21, further comprising a diesel oxidation catalyst.

* * * * *